(12) United States Patent
Martin

(10) Patent No.: US 9,426,328 B2
(45) Date of Patent: Aug. 23, 2016

(54) DYNAMIC DIGITAL WATERMARK

(71) Applicant: MorphoTrust USA, LLC, Billerica, MA (US)

(72) Inventor: Brian Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 14/470,540

(22) Filed: Aug. 27, 2014

(65) Prior Publication Data

US 2015/0063626 A1   Mar. 5, 2015

Related U.S. Application Data

(60) Provisional application No. 61/870,903, filed on Aug. 28, 2013.

(51) Int. Cl.
*G06T 1/00* (2006.01)
*H04N 1/32* (2006.01)

(52) U.S. Cl.
CPC .......... *H04N 1/32325* (2013.01); *G06T 1/0071* (2013.01); *H04N 1/32299* (2013.01); *H04N 1/32304* (2013.01); *H04N 1/32309* (2013.01); *H04N 1/32352* (2013.01)

(58) Field of Classification Search
None
See application file for complete search history.

(56) References Cited

U.S. PATENT DOCUMENTS

| | | | |
|---|---|---|---|
| 5,841,886 A | 11/1998 | Rhoads | |
| 7,004,388 B2 | 2/2006 | Kohta | |
| 8,385,590 B1 * | 2/2013 | Moorer | H04N 21/44008 382/100 |
| 2002/0056043 A1 | 5/2002 | Glass | |
| 2002/0157005 A1 * | 10/2002 | Brunk | G06Q 20/401 713/176 |
| 2003/0023858 A1 * | 1/2003 | Banerjee | H04L 9/3247 713/189 |
| 2003/0085808 A1 | 5/2003 | Goldberg | |
| 2003/0136828 A1 | 7/2003 | Takesada et al. | |
| 2003/0154406 A1 | 8/2003 | Honarvar et al. | |
| 2004/0114779 A1 | 6/2004 | Blazey | |
| 2004/0153649 A1 | 8/2004 | Rhoads et al. | |
| 2004/0243806 A1 | 12/2004 | McKinley et al. | |
| 2004/0258274 A1 | 12/2004 | Brundage et al. | |
| 2005/0160271 A9 * | 7/2005 | Brundage | B42D 15/10 713/176 |
| 2005/0240779 A1 | 10/2005 | Aull et al. | |
| 2005/0256724 A1 | 11/2005 | Rasin et al. | |
| 2006/0206351 A1 | 9/2006 | Hodges et al. | |
| 2006/0212931 A1 | 9/2006 | Shull et al. | |
| 2007/0016790 A1 | 1/2007 | Brundage et al. | |
| 2007/0083915 A1 | 4/2007 | Janakiraman et al. | |
| 2009/0277961 A1 | 11/2009 | Mak | |
| 2009/0307132 A1 | 12/2009 | Phillips | |
| 2010/0170947 A1 | 7/2010 | Christofferson | |
| 2010/0228632 A1 * | 9/2010 | Rodriguez | G06F 3/011 705/14.66 |
| 2011/0077983 A1 | 3/2011 | Hua et al. | |
| 2011/0275360 A1 | 11/2011 | Sample et al. | |
| 2012/0198232 A1 | 8/2012 | Hannel et al. | |
| 2013/0218931 A1 | 8/2013 | Lewis | |
| 2013/0340052 A1 | 12/2013 | Jakobsson | |
| 2014/0098284 A1 | 4/2014 | Oberpriller et al. | |

\* cited by examiner

*Primary Examiner* — Jon Chang
(74) *Attorney, Agent, or Firm* — Fish & Richardson P.C.

(57) ABSTRACT

Some implementations may include a computer-implemented method for applying at least two digital watermarks to a digital document, the method including: receiving a digital document comprising visual contents; generating a first digital watermark to be visually presented at a first time point; generating a second digital watermark to be visually presented at a second time point, the second digital watermark being different from the first digital watermark and the second time point being different from the first time point; and applying both the first digital watermark and second digital watermark to the digital document t.

29 Claims, 29 Drawing Sheets

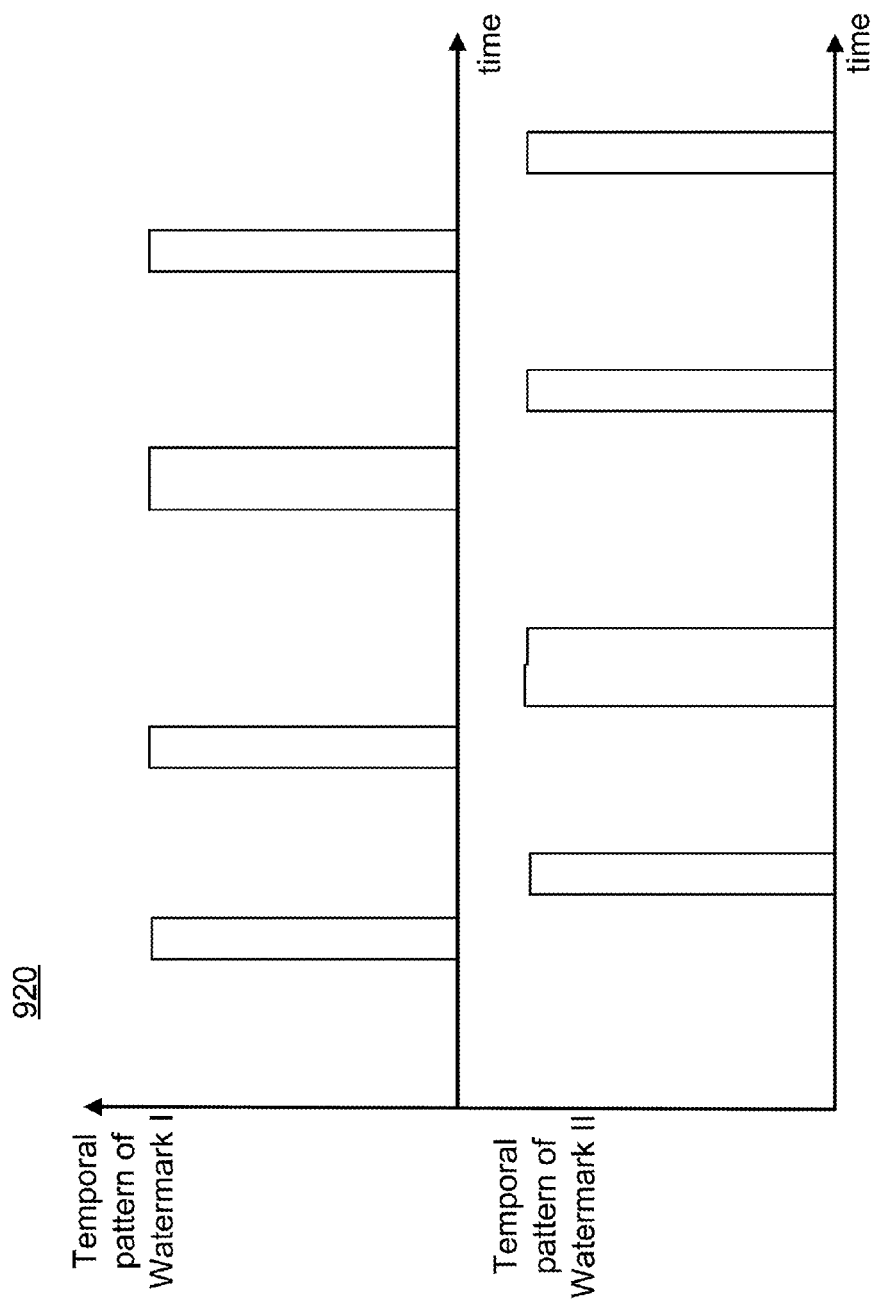

DYNAMIC DIGITAL WATERMARK

CROSS-REFERENCE TO RELATED APPLICATIONS

This application claims the benefit of U.S. Provisional Application No. 61/870,903 filed Aug. 28, 2013, which is incorporated by reference in its entirety.

TECHNICAL FIELD

This document generally relates to digital watermark.

BACKGROUND

Digital watermarking may be used on identification documents, such as digital identification documents, as a security feature to prevent fraud.

SUMMARY

In one aspect, some implementations provide a computer-assisted method for applying at least two digital watermarks to a digital document. The method includes: receiving a digital document comprising visual contents; generating a first digital watermark to be visually presented at a first time point; generating a second digital watermark to be visually presented at a second time point, the second digital watermark being different from the first digital watermark and the second time point being different from the first time point; and applying both the first digital watermark and second digital watermark to the digital document to provide validation of the digital document.

Implementations may include one or more of the following features. The method may further include applying both the first digital watermark and the second digital watermark to form a sequence of digital watermarks capable of providing validation of the digital document. The method may also include: applying the first digital watermark and second digital watermark to the digital document to provide authentication of a person holding the digital document. The method may additionally include: linking the sequence of digital watermarks to an entity issuing the digital document. The method may further additionally include: configuring the sequence of digital watermarks such that the sequence of digital watermarks identify a person holding the digital document.

The method may further include generating a third digital watermark to be visually presented at a third time point, the third digital watermark being different from the first and second digital watermark, and the third time point being different from the first and second digital watermark.

The method may further include applying the first digital watermark such that the first digital watermark is visually presented intermittently according to a first temporal pattern. The method may additionally include configuring the first temporal pattern to encode information linking an entity issuing the digital document with at least two digital watermarks. The method may further include configuring the first temporal pattern to encode information linking a person holding the generated digital document with at least two digital watermarks. The method may additionally further include applying the second digital watermark such that the second digital watermark is visually presented intermittently according to a second temporal pattern. The method may further additionally include configuring the second temporal pattern to encode information linking an entity issuing the digital document with at least two digital watermarks. The method may also additionally include configuring the second temporal pattern to encode information linking a person holding the generated digital document with at least two digital watermarks.

The method may further include applying the first digital watermark and the second digital watermark to the digital document such that the first time point differs from the second time point by an mount shorter than a retina dwell time.

Generating the first digital watermark may further include generating the first digital watermark to encode information correlatable with data encoded by the second digital watermark. Generating the second digital watermark further include generating the second digital watermark to encode information correlatble with data encoded by the first digital watermark.

In another aspect, some implementations provide a a system for digitizing an identification document, the system comprising at least one computer processor configured to perform the operations of: receiving a digital document comprising visual contents; generating a first digital watermark to be visually presented at a first time point; generating a second digital watermark to be visually presented at a second time point, the second digital watermark being different from the first digital watermark and the second time point being different from the first time point; and applying both the first digital watermark and second digital watermark to the digital document to provide validation of the digital document.

Implementations may include one or more of the following features. The operations may further include applying both the first digital watermark and the second digital watermark to form a sequence of digital watermarks capable of providing validation of the digital document. The operations may additionally include applying the first digital watermark and second digital watermark to the digital document to provide authentication of a person holding the digital document. The operations may further additionally include linking the sequence of digital watermarks to an entity issuing the digital document. The operations may additionally further include configuring the sequence of digital watermarks such that the sequence of digital watermarks identifies a person holding the digital document.

The operations may additionally include generating a third digital watermark to be visually presented at a third time point, the third digital watermark being different from the first and second digital watermark, and the third time point being different from the first and second digital watermark.

The operations may further include applying the first digital watermark such that the first digital watermark is visually presented intermittently according to a first temporal pattern. The operations may additionally include configuring the first temporal pattern to encode information linking an entity issuing the digital document with at least two digital watermarks. The operations may further include configuring the first temporal pattern to encode information linking a person holding the generated digital document with at least two digital watermarks.

The operations may further include applying the second digital watermark such that the second digital watermark is visually presented intermittently according to a second temporal pattern. The operations may further include configuring the second temporal pattern to encode information linking an entity issuing the digital document with at least two digital watermarks. The operations may further include configuring the second temporal pattern to encode information linking a person holding the generated digital document with at least two digital watermarks. The operations further include applying the first digital watermark and the second digital watermark to the digital document such that the first time point differs from the second time point by an mount shorter than a retina dwell time.

Generating the first digital watermark may further include generating the first digital watermark to encode information correlatable with data encoded by the second digital watermark. Generating the second digital watermark may further include generating the second digital watermark to encode information correlatble with data encoded by the first digital watermark.

In yet another aspect, some implementations provide a computer-readable medium, comprising software instructions that, when executed by a processor, causes the processor to perform the operations of: receiving a digital document comprising visual contents; generating a first digital watermark to be visually presented at a first time point; generating a second digital watermark to be visually presented at a second time point, the second digital watermark being different from the first digital watermark and the second time point being different from the first time point; and applying both the first digital watermark and second digital watermark to the digital document to provide validation of the digital document.]

In still another aspect, some implementations provide a computer-implemented method for validating a digital document, the method including: receiving, at a mobile device, the digital document comprising at least two digital watermarks, the digital document issued by a central entity; retrieving a first digital watermark from the digital document, the first digital watermark visually presented at a first time point; retrieving a second digital watermark from the digital document, the second digital watermark visually presented at a second time point, the second digital watermark being different from the first digital watermark and the second time point being different from the first time point; and validating the digital document based on the retrieved first and second digital watermarks.

Implementations may include one or more of the following features. Validating the digital document may further include: retrieving a sequence of digital watermarks comprising the first digital watermark and the second digital watermark, wherein the sequence of digital watermarks is capable of validating that the digital document is authentic. Retrieving the sequence of digital watermarks may include retrieving a sequence of digital watermarks comprising the first digital watermark, the second digital watermark, and a third digital watermark, the third digital watermark being different from the first digital watermark and the second digital watermark. The method may further include analyzing the sequence of digital watermarks to confirm that the digital document is issued by the central entity. The method may additionally include: analyzing the sequence of digital watermarks to confirm that a person holding the digital document is the person identified by the sequence of digital watermarks.

The method may further include detecting a first temporal pattern in which the first digital watermark is visually presented intermittently. The method may additionally include: decoding, from the first temporal pattern, information linking an entity who has generated the digital document; and determining whether the linked entity is the central entity. The method may further include decoding, from the first temporal pattern, information linking a holder of the digital document; and determining whether the linked holder is the person presenting the digital document.

The method may further include detecting a second temporal pattern in which the second digital watermark is visually presented intermittently. The method may additionally include decoding, from the second temporal pattern, information linking an entity who has generated the digital document; and determining whether the linked entity is the central entity. The method may further include decoding, from the second temporal pattern, information linking a holder of the digital document; and determining whether the linked holder is the person presenting the digital document.

The method may further include extracting information from the first digital watermark, the information correlatable with data encoded by the second digital watermark; correlating the extracted information with data encoded by the second digital watermark; and determining whether the digital document is authentic based on the correlation results.

The method may further include extracting information from the second digital watermark, the information correlable with data encoded by the first digital watermark; correlating the extracted information with data encoded by the first digital watermark; and determining whether the digital document is authentic based on the correlation results.

In yet still another aspect, some implementations provide a mobile computing device for authenticating a person, the mobile computing device comprising at least one processor configured to perform operations comprising: receiving, at a mobile device, the digital document comprising at least two digital watermarks, the digital document issued by a central entity; retrieving a first digital watermark from the digital document, the first digital watermark visually presented at a first time point; retrieving a second digital watermark from the digital document, the second digital watermark visually presented at a second time point, the second digital watermark being different from the first digital watermark and the second time point being different from the first time point; and validating the digital document based on the retrieved first and second digital watermarks.

Implementations may include one or more of the following features. Validating the digital document may further include retrieving a sequence of digital watermarks comprising the first digital watermark and the second digital watermark, wherein the sequence of digital watermarks is capable of validating that the digital document is authentic. Retrieving the sequence of digital watermarks may include retrieving a sequence of digital watermarks comprising the first digital watermark, the second digital watermark, and a third digital watermark, the third digital watermark being different from the first digital watermark and the second digital watermark.

The operations may further include analyzing the sequence of digital watermarks to confirm that the digital document is issued by the central entity. The operations may additionally include analyzing the sequence of digital watermarks to confirm that a person holding the digital document is the person identified by the sequence of digital watermarks. The operations may additionally include detecting a first temporal pattern in which the first digital watermark is visually presented intermittently. The operations may further include decoding, from the first temporal pattern, information linking an entity who has generated the digital document; and determining whether the linked entity is the central entity. The operations may further include decoding, from the first temporal pattern, information linking a holder of the digital document; and determining whether the linked holder is the person presenting the digital document.

The operations may further include detecting a second temporal pattern in which the second digital watermark is visually presented intermittently. The operations may further include: decoding, from the second temporal pattern, information linking an entity who has generated the digital document; and determining whether the linked entity is the central entity. The operations may further include decoding, from the second temporal pattern, information linking a holder of the digital document; and determining whether the linked holder is the person presenting the digital document.

The operations may additionally include extracting information from the first digital watermark, the information correlatable with data encoded by the second digital watermark; correlating the extracted information with data encoded by the second digital watermark; and determining whether the digital document is authentic based on the correlation results.

In yet another aspect, some implementations may provide a computer-readable medium, comprising software instructions that, when executed by a computer processor, causes the computer processor to perform the operations of: receiving, at a mobile device, the digital document comprising at least two digital watermarks, the digital document issued by a central entity; retrieving a first digital watermark from the digital document, the first digital watermark visually presented at a first time point; retrieving a second digital watermark from the digital document, the second digital watermark visually presented at a second time point, the second digital watermark being different from the first digital watermark and the second time point being different from the first time point; and validating the digital document based on the retrieved first and second digital watermarks.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 9C is a timing diagram showing example temporal patterns according to which the at least two digital watermarks may be displayed.

Like reference symbols in the various drawings indicate like elements.

DETAILED DESCRIPTION

Digital watermarks may be embedded in a digital document as a security feature. Two or more digital watermarks may be embedded in a digital document and the digital watermarks may be presented at different times, thus providing a sequence of digital watermarks. The sequence of digital watermarks may provide validation that a digital document is authentic. In some implementations, the sequence of digital watermarks may provide a "video signature" linking the digital document to the entity that has generated the digital document. In other implementations, the digital watermarks may be presented intermittently according to respective temporal patterns. The respective temporal patterns may encode information in addition to the payload data of each digital watermark. The encoded information may be linked to either the entity that has generated the digital document or the person holding the digital document.

Figure 1:
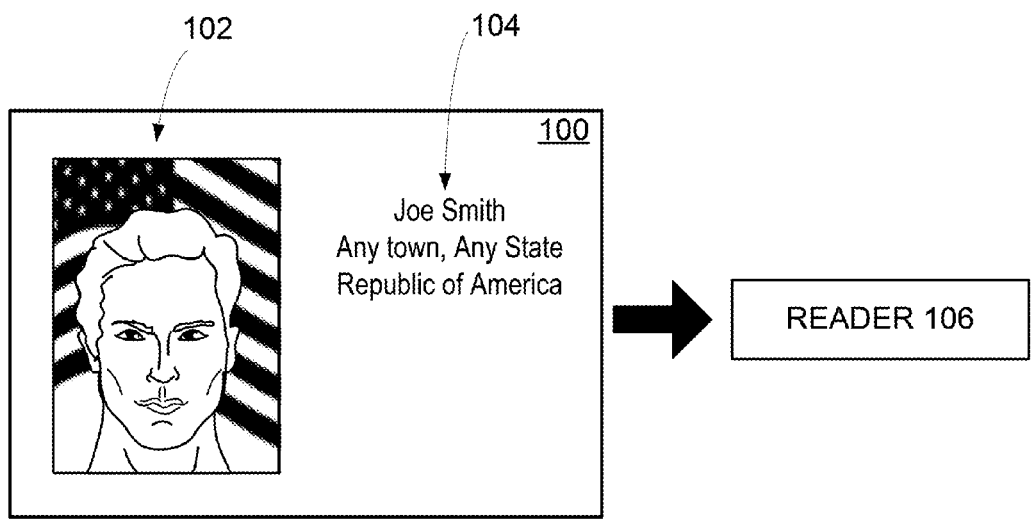
FIG. 1 illustrates an example identification document according to some implementations.

FIG. 1 illustrates an example identification document 100 according to some implementations. Identification document 100 may be a government-issued identification document, such as, for example, a driver's license issued by the department of motor vehicles (DMV) of a state, a passport issued by the state department, a social security card issued by the social security administration (SSA), a medicare card issued by the department of health and human services (DHS), a Medicaid card issued by the DHHS, etc. The identification document may be issued by a government entity, for example, the DMV at the state level, or the state department at the federal level. The identification document may also be issued by non-government entities, such as a contracting entity of a government agency. Identification document 100 may also be other identification documents, such as, for example, a student identification card issued by a school, a membership card issued by an organization, an employee identification card issued by an employer, etc.

Portrait 102 may include a facial portrait of the holder of the identification document. The facial portrait may identify the person holding the identification document. The facial portrait may be 2×2 in and showing the front face of the holder. In some implementations, portrait 102 may include a facial biometric of the document holder. In some implementations, portrait 102 may manifest as other forms of biometrics, such as, for example, a finger-print, a palm-print, a retina scan, a iris scan, a pupil scan, etc.

Personally identifiable information 104 may include name (including full name, first name, last name, middle/initials), residential address, gender, nationality, occupation, marital status, eye color, hair color, blood type etc. Personally identifiable information 104 may also include numerical terms such as date of birth, height, weight, election zone, document number, issue date, etc. Portions of personally identifiable information may be printed on the identification document.

Identification document 100 may be verified by reader 106. Reader 106 may represent a human inspector, for example, a cashier at a liquor store, a security guard at a building, etc. In some implementations, the human inspector may be assisted by a reader device. The identification document may be analyzed by reader 106 to verify that (i) the identification document is authentic and has not been forged or altered; (ii) the person presenting the identification document is the person identified by the identification document.

To prove the source of an identification document, digital watermark(s) may be embedded into an identification document. Additionally, digital watermark(s) may carry personally identifiable information about the holder. Thus, digital watermark(s) can be used on an identification document to authenticate the identification document and carry information about the identity of the holder Digital watermark(s) may be secure, covert and machine-readable. Digital watermark(s) may be generally imperceptible to naked eyes. In fact, digital watermark(s) may generally appear as noise, for example, added to a background noise. However, altering a digital watermark may be virtually impossible, and the mere lack of presence of a digital watermark can immediately indicate tampering and likely counterfeiting. Hence, digital watermark(s) used in an identification document may provide strong and effective deterrence to counterfeit.

To validate an identification document, steganography may analyze the digital watermark to identify the source and reveal the information identifying the holder. In some implementations, data contents encoded by the digital watermarks may be encrypted so that the encoded data contents may remain secure, as an additional security mechanism. Such encrypted data contents may be decrypted first. In some implementations, the digital watermark may be initially analyzed to extract frequency domain information. The frequency domain information may include spectrum information manifested by, for example, the digital cosine transforms (DCT) coefficients in a particular spatial frequency range. In contrast to spatial domain information, such frequency domain information may be robust to cropping or translation of the original document. Hence, the frequency domain information may be more tamper-proof and more resilient to artifacts during field use. Likewise, mixed-domain information, i.e., information from both spatial domain and frequency domain may provide similar degree of robustness against tampering and artifacts. However, the implementations disclosed herein are not limited to the use of frequency domain information alone or the use of mixed-domain information. Spatial domain information may be used according to the same scheme as disclosed herein.

Figure 2A:
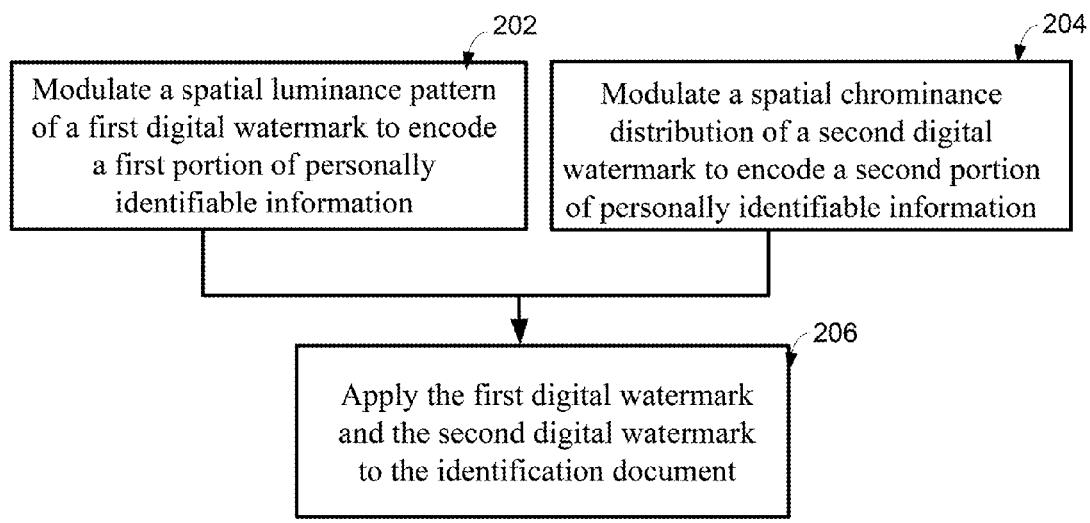
FIG. 2A is a flow chart showing an example method of combining luminance and chrominance modulations to digitally watermark an identification document according to some implementations.

FIG. 2A is a flow chart showing an example method of combining luminance and chrominance modulations to digitally watermark an identification document according to some implementations. A spatial luminance pattern associated with a first digital watermark may be modulated to encode a first portion of personally identifiable information (202). The spatial luminance pattern may refer to an intensity map of brightness. The luminance may be gamma corrected, and referred to as luma. Gamma correction generally tailors the presentation of brightness in a non-linear fashion, for example, according to a power-law. The non-linear correction may enhance visual perception of the encoded color. The modulation may manifest as, for example, a spatial Moire's pattern. Moire's patterns may include line patterns, complex shapes, or even symbols. The patterns, shapes, and symbols may be linked to the issuer, such as the DMV, the state department, an employer, etc. The modulation may reveal the information encoded, such as a number or an alphabetic letter. The encoded information may also be embedded in the granny noise of the intensity pattern and may be undetectable to the naked eyes. Moreover, the encoded information may be encrypted to provide additional security.

On the same identification document, a spatial chrominance distribution associated with a second digital watermark may be modulated (204). The chrominance pattern may refer to a color map. Color maps may be indexed in a multi-dimensional color space. For example, an RGB space may be based on the primary colors of red, green, and blue. An example color space may also be based on the three primary colors of cyan, magenta, and yellow. In some implementations, the chrominance pattern may also use a color map indexed by two components, for example, based on the U and V components of the YUV model, or based on the Cb and Cr components of the YCbCr model, or based on the Pb and Pr components of the YPbPr model. The encoded information may manifest as color smear patterns showing numbers, alphabetical letters, or symbols. The encoded information may appear as color aberration noise unperceivable to naked eyes. Similar to the first digital watermark with modulated spatial luminance pattern, the second modulated spatial chrominance distribution may carry encrypted information.

In some implementations, the first digital watermark with the modulated spatial luminance pattern and the second digital watermark with the modulated spatial chrominance distribution may be applied to the same identification document (206). The two digital watermarks may be applied to different sides of the identification document, for example, the front and back of a driver license, front and back of any given page of a passport, etc. The two digital watermarks may be applied to different regions on the same side of the identification document. The two regions where each digital watermark has been applied may share a common region. The two digital watermarks may also be applied to the same region on the same side of the identification document. The two digital watermarks may be applied to different grating structures underneath the same page of the identification document such that only one digital watermark is detectable from a given viewing angle or a particular viewing direction. In other words, detection of the given digital watermark may be viewing-angle dependent or viewing-direction dependent.

The first digital watermark with luminance modulations and the second digital watermark with chrominance modulations may encode a common piece of information based on which the two digital watermarks may mutually authenticate each other. The process may be known as a cross-correlation. To cross-correlate the information encoded by the two digital watermarks, a correlatable portion of information may be determined for the correlation purpose. The determination may take place when the digital watermarks are being applied to the identification document. The digital watermarks on an identification document may encode information identifying the issuing entity, such as, for example, the DMV, the state department, the employer. The digital watermarks on an identification document may encode personally identifiable information about the holder of the identification document. As discussed above, personally identifiable information may include name (including full name, first name, last name, middle/initials), date of birth, height, weight, residential address, gender, nationality, occupation, marital status, eye color, hair color, blood type election zone, document number, issue date, etc.

Figure 2B:
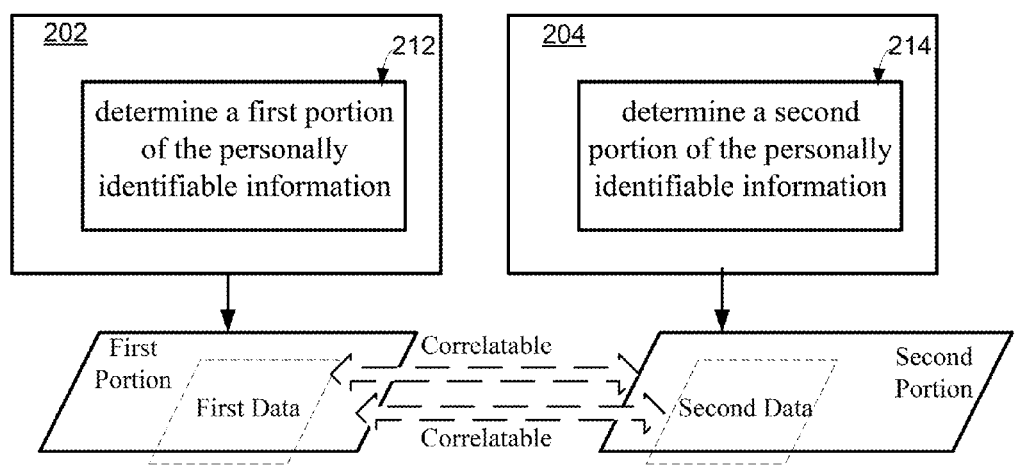
FIG. 2B is a flow chart showing an example of a method for determining correlatable portions of personally identifiable information for luminance and chrominance modulations according to some implementations.

FIG. 2B is a flow chart showing an example of a method for determining correlatable portions of personally identifiable information for luminance and chrominance modulations according to some implementations. Determining a first portion of personally identifiable information (212) may take place during the stage of modulating the luminance pattern of the first digital watermark (202). The first portion of personally identifiable information may include any portion of personally identifiable information as discussed above. Likewise, determining a second portion of personally identifiable information (214) may take place during the stage of modulating the chrominance distribution of the second digital watermark (204) and the second portion of personally identifiable information may also include any portion of the personally identifiable information as discussed above. Nonetheless, the first portion of personally identifiable information may include first data that is correlatable with second data from the second portion of personally identifiable information. The first data may be identical in contents to the second data. Correlating the first data with the second data may be a comparison of the first data and the second data. The comparison may be a string comparison. The comparison may also be a numerical subtraction. The first data and the second data, once combined, may reveal a piece of personally identifiable information of the holder. For example, the first data may include the odd digits of the birth date while the second data may include the even digits of the birth date. For example, the first data may be the beginning five digits of the holder's social security number while the second data may be the ending four digits of the holder's social security number. Correlating the first data with the second data may be a string combination or concatenation. In some implementations, the correlatable data may be information other than the personally identifiable information of the holder. For example, the correlatable data may be the issuing authority's emblem symbol, acronym of the employer, etc. As discussed above, the first portion and the second portion may be encrypted.

Figure 2C:
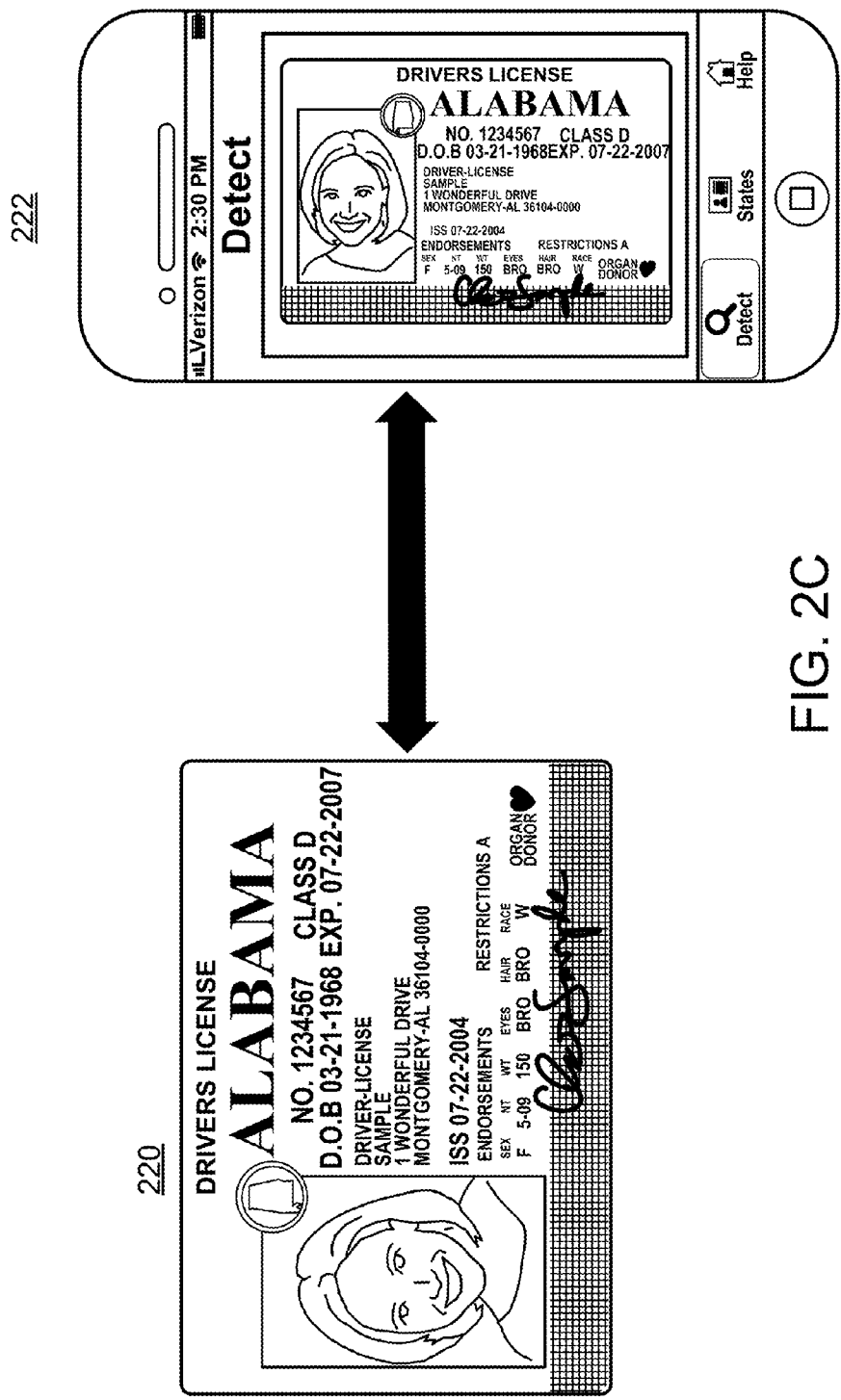
FIG. 2C shows an example identification document digitally watermarked according to some implementations.

The digital watermark with luminance modulation and the digital watermark with chrominance modulation may be applied to the same identification document. The two distinct digital watermarking mechanisms may be applied either a physical identification document or a digital identification document. FIG. 2C shows a physical identification document 220 and a digital identification document 222 displayed on a mobile device.

Figure 3A:
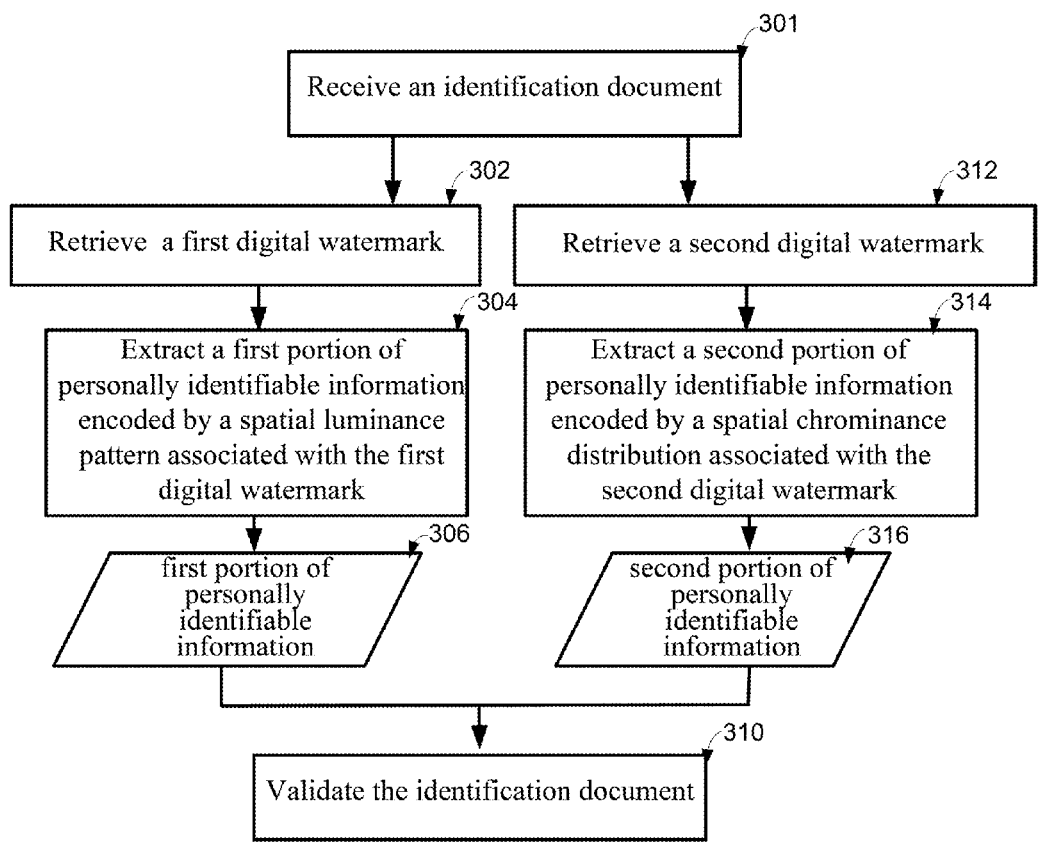
FIG. 3A is a flow chart showing an example method of authenticating an identification document based on the luminance and chrominance modulations of digital watermarks according to some implementations.

To valid the identification document, the two digital watermarks may be analyzed and the information encoded by each digital watermark may be compared against each other. FIG. 3A is a flow chart showing an example method of authenticating an identification document based on the luminance and chrominance modulations of digital watermarks according to some implementations. An identification document may be received (301). The identification document may be digitally watermarked as discussed above. For example, the identification document may include a first digital watermark with a modulated spatial luminance pattern and a second digital watermark with a modulated spatial chrominance distribution. The first digital watermark may be retrieved by a scanning device (302). The scanning device may be configured to read the machine-readable luminance pattern encoding the first portion of personally identifiable information. As a result, the first portion of personally identifiable information 306 may be extracted from the spatial luminance pattern associated with the first digital watermark (304). Likewise, the scanner may retrieve the second digital watermark from the identification document (312). As discussed above, the second digital watermark may include a spatial chrominance distribution to encode a second portion of personally identifiable information. The scanner device may be configured to extract the second portion of personally identifiable information 316 from the spatial chrominance distribution of the second digital watermark (314). When reading out the first portion of personally identifiable information 306 and the second portion of personally identifiable information 316, the scanning device may be configured to extract the encoded information simultaneously. The encoded information may be encrypted, for example, by the private key of the issuing authority. In some implementations, the scanning device may be configured to decrypt the encoded information, for example, by using a public key of the issuing authority. The identification document may be validated based on the first portion of personally identifiable information as well as the second portion of personally identifiable information (310).

Figure 3B:
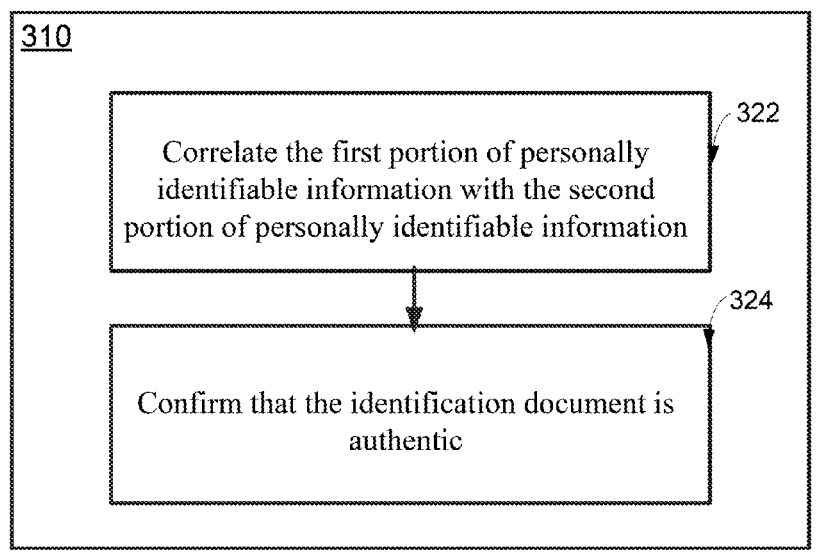
FIG. 3B is a flow chart showing an example method of correlating portions of personally identifiable information according to some implementations.

FIG. 3B is a flow chart showing an example method of correlating portions of personally identifiable information according to some implementations. In validating the identification document (310), the first portion of personally identifiable information may be correlated with the second portion of personally identifiable information (322). The first and second portions of personally identifiable information may include a common piece of information, for example, the holder's birth date. Correlating the first and second portions may include comparing a piece of information meant to be identical in contents and encoded by two independent mechanisms. As discussed above, correlating may also include combining or concatenating pieces of information from the first and second portions. The correlation may yield a matching result indicating a confirmation the identification document is authentic (324).

The match may not be perfect. In some implementations, for example, the frequency domain information encoded by the two digital watermarks may be incomplete due to losses in the scanning process. In some implementations, the degree of match may depend on the context of the application. For example, for applications involving mobile transactions with a financial sum of under $500, a lower degree of match level may be sufficient. While for applications involving accessing high security facilities such as nuclear plant to military installation, a higher degree of match may be adopted. In some implementations, the matching process may depend on jurisdiction. For example, in some states which adopted a less sophisticated digital watermark, a more primitive match procedure may be performed. Even in states that have adopted a more sophisticated digital watermark, a legacy digital identification document may still use the old and less sophisticated digital watermarking. The legacy identification document may still be honored by a more primitive matching procedure. In some implementations, ascertaining whether there is a substantial match may further factor in usage history of the holder of the identification document. For example, if the person requesting access at the building has frequently gained access to the building in the past, then the degree of match may be lessened to simplify the process. In a similar vein, a trusted visitor database can be set up to track such visitors and potentially speed up the validation process.

If substantial match has been found between the encoded data from the first and second portions of identification document, then the authenticity of the identification document may be confirmed (324). Conversely, if substantial match has not been found between the encoded data from the first and second portions of identification document, then the authenticity of the identification document may not be confirmed. In some implementations, the holder of the identification document may be alerted if the authenticity of the identification document cannot be established. The alert may sent through email, automatic voicemail, short message service (SMS) message, etc., to a registered account of the holder of the identification document.

Figure 3C:
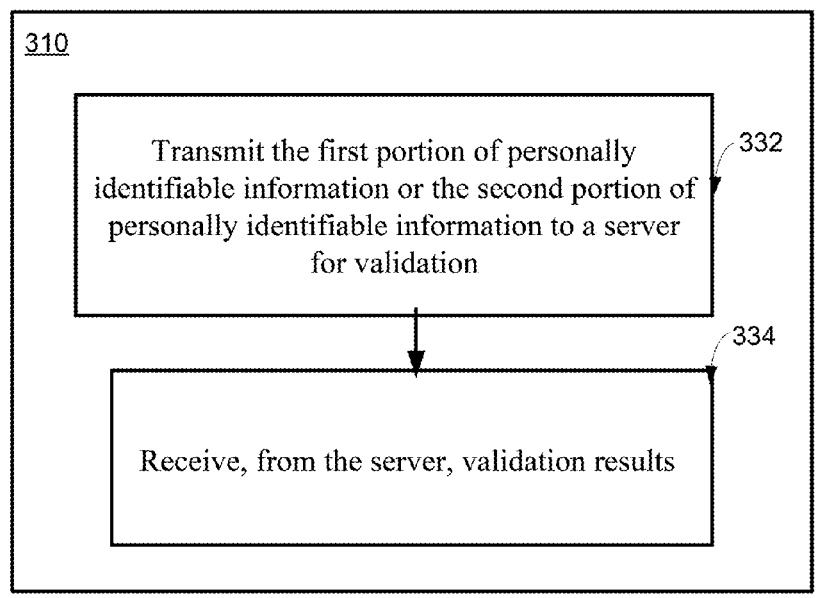
FIG. 3C is a flow chart showing an example method of validating portion(s) of personally identifiable information encoded by a digital watermark according to some implementations.

FIG. 3C is a flow chart showing an example method of validating portion(s) of personally identifiable information encoded by a digital watermark according to some implementations. In some implementations, the scanner device may transmit the decoded first portion of personally identifiable information or the second portion of personally identifiable information to a server for validation (332). The transmitted personally identifiable information may include information not printed on the identification document or information encrypted by the issuing authority of the identification document. The server may be maintained by the issuing authority or a proxy of the issuing authority. If the personally identifiable information received at the server has been encrypted by the issuing authority, the server may first decrypt the received information. The encryption may utilize a public key of the issuing authority and may be decrypted by the corresponding private key of the issuing authority. The encrypted information may also include an integrity check. Example integrity checks may include a check sum, a hash, a cyclic redundancy check (CRC) code, etc.

The server may compare the received personally identifiable information with a record stored in the database. In comparing the received personally identifiable information against the database, the server may implement different levels of matching depending on the context of the application, as discussed above. If an adequate match has been identified, the server may notify the scanning device of the match. If, however, no adequate match can be identified, the server may alert the scanning device of the lack of match. Therefore, the scanning device may receive validation results from the server (334), according to some implementations.

Figure 4A:
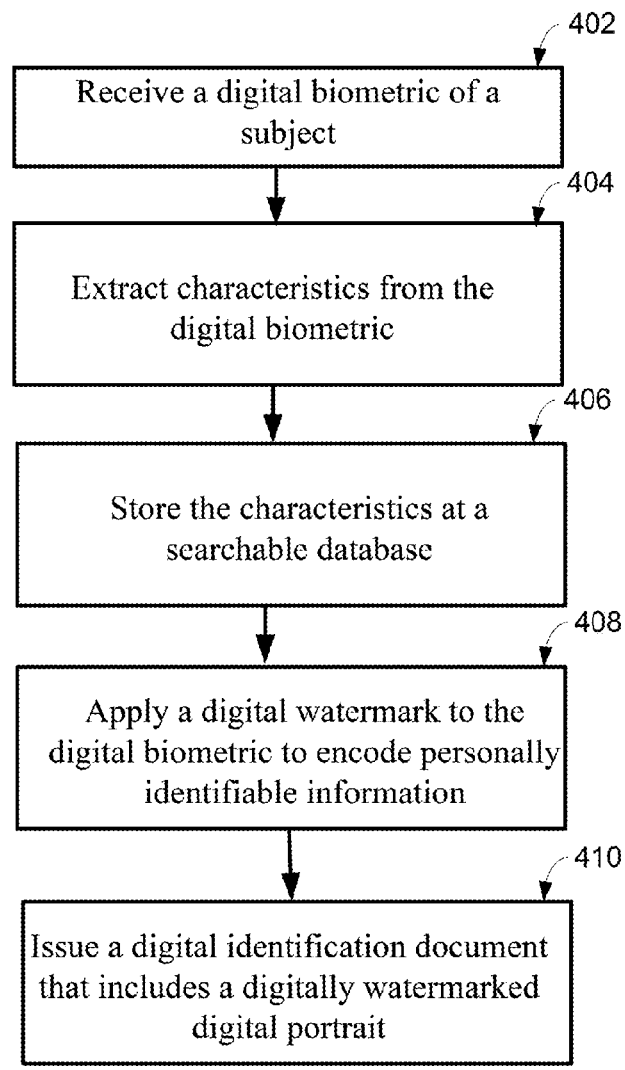
FIG. 4A is a flow chart showing an example method of combining a biometric and a digital watermark on a digital identification document according to some implementations.

In some implementations, the digital watermark(s) may be combined with a digital biometric to provide a digital identification document for secure authentication. FIG. 4A is a flow chart showing an example method of combining a biometric and a digital watermark on a digital identification document according to some implementations. A digital biometric of a subject may be received (402). The digital biometric may be a digital representation of a biometric. The digital representation may be in the form of a binary file stored in a storage device, such as, for example, hard disk drive, non-volatile memory, dynamic random access memory, etc. The biometric may include a facial portrait, a finger-print, a palm-print, a iris pattern, a retina pattern, etc. of a subject. The digital biometric may the biometric encoded in any digital encoding scheme suitable for storage on a computing device having at least one processor. The encoding scheme may account for the underlying processor architecture, for example, big endian or little endian.

Characteristics may be extracted from the digital biometric (404). For example, a facial recognition software may extract facial characteristics from a digital portrait of the subject. In some implementations, an analytical algorithm may extract characteristics from a finger-print, for example, by decomposing the finger-print pattern into principal components (also known as singular value decomposition). In some implementations, an analytic algorithm may extract characteristics from a finger-print based on coefficients from edge preserving transformations such as wavelet transforms, Hough transforms, etc. Similar analytical algorithms may be applied to extract characteristics from a palm-print, an iris pattern, a retina pattern, a pupil pattern, etc.

The extracted characteristics may serve as a compressed representation of the digital biometric. The extracted characteristics may then be stored at a searchable database (406). Using the extracted characteristics, rather than the full digital biometric may reduce storage space requirement or enhance search speed. In some implementations, the extracted characteristics may be stored at a central server managed by the entity issuing the identification document. In some implementations, a copy of the extracted characteristics may be stored on a mobile device of the subject, i.e., the person from whom the digital biometric was taken.

Next, a digital watermark may be applied to the digital biometric of the subject (408). In some implementations, the digital watermark may be applied to an area other than the digital biometric on the digital identification document. The digital watermark may be applied to encode any number, letter, or symbology in accordance with the description herein. In some implementations, digital watermarks including both luminance and chrominance modulations may be applied, as described above. In some implementations, the encoded information may be encrypted, as disclosed above. In some implementations, the digital watermarks may encode personally identifiable information of the subject. As discussed herein, the personally identifiable information may include name (including full name, first name, last name, middle/initials), date of birth, height, weight, residential address, gender, nationality, occupation, marital status, eye color, hair color, blood type election zone, document number, issue date, etc. In some implementations, the digital watermarks may encode information indicating the source or the issuing entity of the digital identification document.

Thereafter, a digital identification document may be issued (410). The digital identification document may include both the digital biometric and the digital watermark. In some implementations, the digital identification document may include a digitally watermarked digital biometric. The digital identification document may be issued to a mobile device of the subject. Example mobile devices may include smart phones, such as, for example, an iPhone, a Samsung smart phone, a HTC smart phone, an Android smart phone, a Windows smart phone, etc. In addition, mobile device may include a tablet device, for example, an iPad, a Samsung Note device, a Microsoft touch device, etc. Further, mobile device may also include a laptop device, or even a desktop computer at home. The digital identification document may be issued in the form of a digital file stored on the mobile device.

Figure 4B:
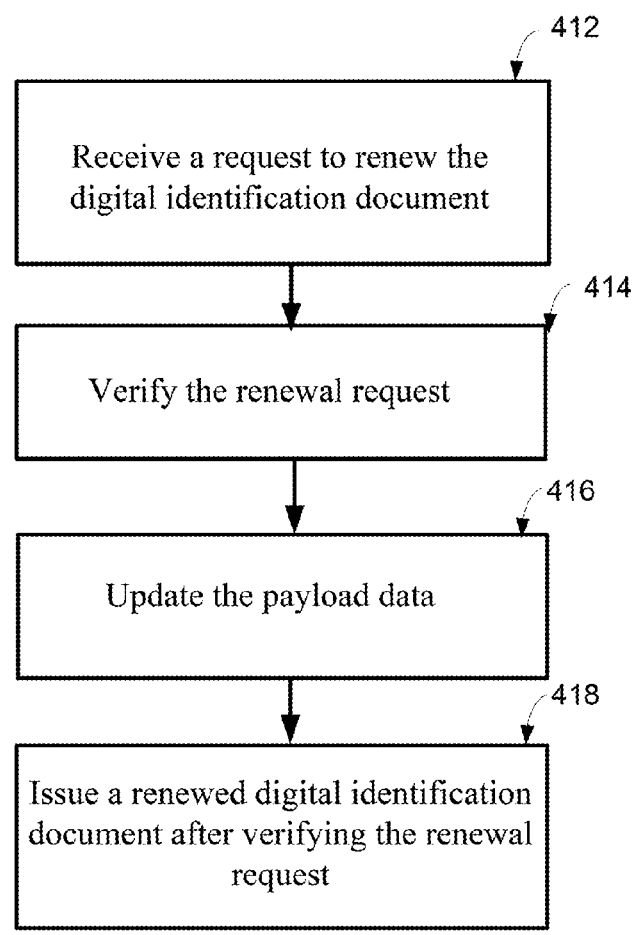
FIG. 4B is a flow chart showing an example process of renewing a digital identification document according to some implementations.

A digital identification document can lead to increased ease in document renewal or replacement. FIG. 4B is a flow chart showing an example process of renewing a digital identification document according to some implementations. A request to renew the digital identification document may be received (412). The request may be received on-line by a server at the issuing entity. The server may verify the renewal request (414). For example, the server may check the source of the renewal request to confirm the validity of the request. The source may refer to the originating device, for example, the subject's mobile device. The source device may be verified based on a secured identifier associated with the mobile device. The source may also refer to the requestor who submitted the renewal request. The requestor may submit the request through an on-line account and therefore may be verified according to the user authentication protocol for accessing the on-line account. In submitting the renewal request, the subject may update some personally identifiable information, such as, for example, marital status, occupation, residential address, etc. The subject may also submit a more recent biometric, such as, for example, a more recent facial portrait. After receiving the updated personally identifiable information, the server may update payload data associated with the digital watermark accordingly (416). As discussed above, the payload data may encode a portion of the personally identifiable information of the subject. Thereafter, the server may issue a renewed identification document (418). The renewed identification document may be issued to the subject's mobile device for display in the same manner as described above. The renewed identification document may be issued with a new expiration date later than the old expiration date on the replaced identification document. In some implementations, the renewed digital identification document may incorporate updated information other than personally identifiable information. Examples may include donor consent information. In issuing the renewed digital identification document, neither a physical trip to the issuing entity nor a physical copy may be required.

Figure 4C:
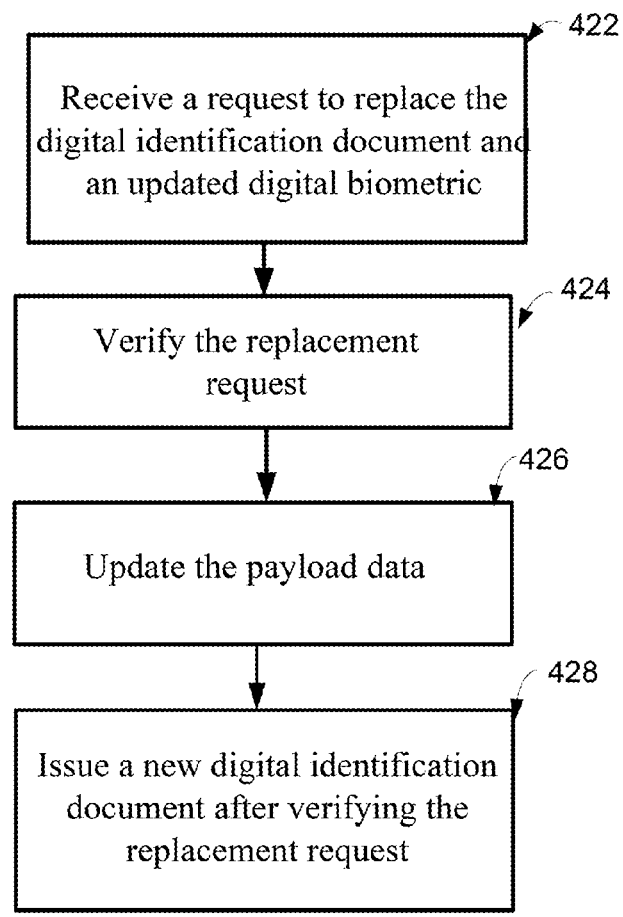
FIG. 4C is a flow chart showing an example process of replacing a digital identification document according to some implementations.

Similar ease may be observed in the replacement process (for example, when the subject lost the digital identification document due to storage failure). FIG. 4C is a flow chart showing an example process of replacing a digital identification document according to some implementations. A request to replace the digital identification document may be received (422). The request may be received on-line by a server at the issuing entity. The server may verify the replacement request (424) by means similar to the descriptions above. The replacement request may update the personally identifiable information of the subject which may cause the server to update the payload data associated with the digital watermark to be applied (426). Thereafter, the replacement digital identification document may be issued (428) in accordance with the descriptions herein. In some implementations, the identification document may be issued with a version number to distinguish from the replaced identification document. The version number may be tracked by the server in future administrations. In some implementations, the renewed digital identification document may incorporate updated information other than personally identifiable information. Examples may include donor consent information. Similar to the disposition of a renewal request, neither a physical trip to the issuing entity nor a physical copy may be required.

Likewise, revocation or suspension of a digital identification document may be accomplished without a physical trip to the issuing entity or the destruction of a physical document. In some implementations, a revocation request may be submitted on-line to a server at the issuing entity. After verifying the revocation request, the server may revoke the digital identification document by removing the digital identification document from the storage medium on the mobile device of the document holder. In some implementations, the server may issue a revoked digital identification document to overwrite the original digital identification document. In so doing, the server may keep a version number of the digital identification document issued. The version number may be checked when the holder attempts to validate the digital identification document on the holder's mobile device.

Figure 4D:
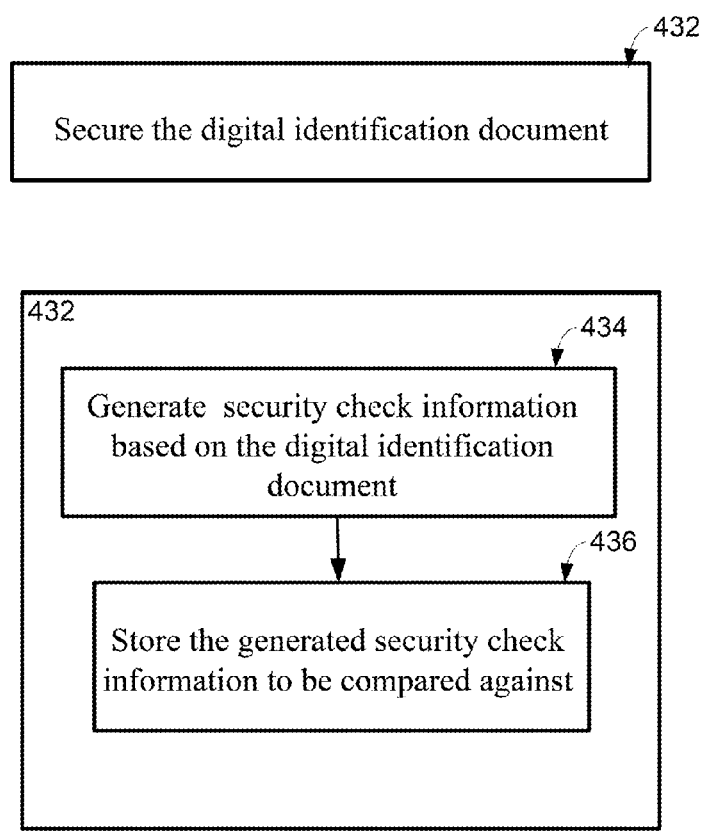
FIG. 4D is a flow chart showing an example method of securing the digital identification document according to some implementations.

FIG. 4D is a flow chart showing an example method of securing the digital identification document according to some implementations. In addition to encryption, the integrity of the digital identification document may be secured (432), for example, by security check information embedded into the digital identification document. The embedded security check information may be encrypted as described above. In particular, the integrity check information may be embedded into the digital identification document based on which alterations of the digital identification document can be detected. For example, security check information may be generated based on the contents of the digital identification document (434). Such security check information may include but may not be limited to a check sum, a hash, a cyclic redundancy check (CRC) code, etc. The security check information may be stored for comparison. In some implementations, the security check information may be stored on a server at the issuing entity. In some implementations, the security check information may be stored on the mobile device. The stored copy may be compared against at the time of service.

Figure 4E:
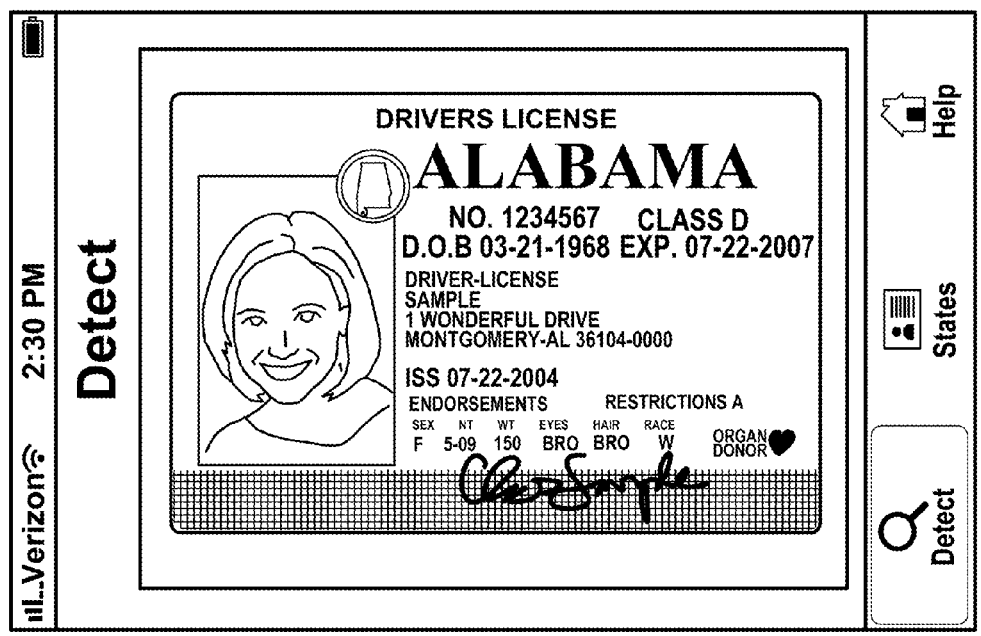
FIG. 4E shows an example digital identification document displayed on a mobile device according to some implementations.

FIG. 4E shows a digital identification document 440 according to some implementations. Digital identification document 440 may be displayed on, for example, the touch screen of a smartphone. The size of the displayed digital identification document may be mimic the size of a physical identification document. For example, a driver's license may be of the dimension of ID-1. ISO/IEC 7810 standard for ID-1 is nominally 85.60 by 53.98 millimeters (3.370 in×2.125 in), which is about the size of a credit card. The display may be implemented by a custom application capable of handling the file format of the digital identification document. The custom application may prevent screen capture programs from saving the screen display to generate a screen copy of the digital identification document. In some implementations, the digital identification document may only be viewable from the custom application on the subject's mobile device. For example, the digital identification document may be encrypted by a public key of the mobile device of the subject. The corresponding private key may be tied to the mobile device and accessible only from the mobile device. As a result, only the subject's mobile device may be capable of displaying the digital identification document to a human inspector. The digital identification document may be encrypted using the issuing entity's private key and the custom software may be configured to decrypt only with the issuer's public key.

Figure 5A:
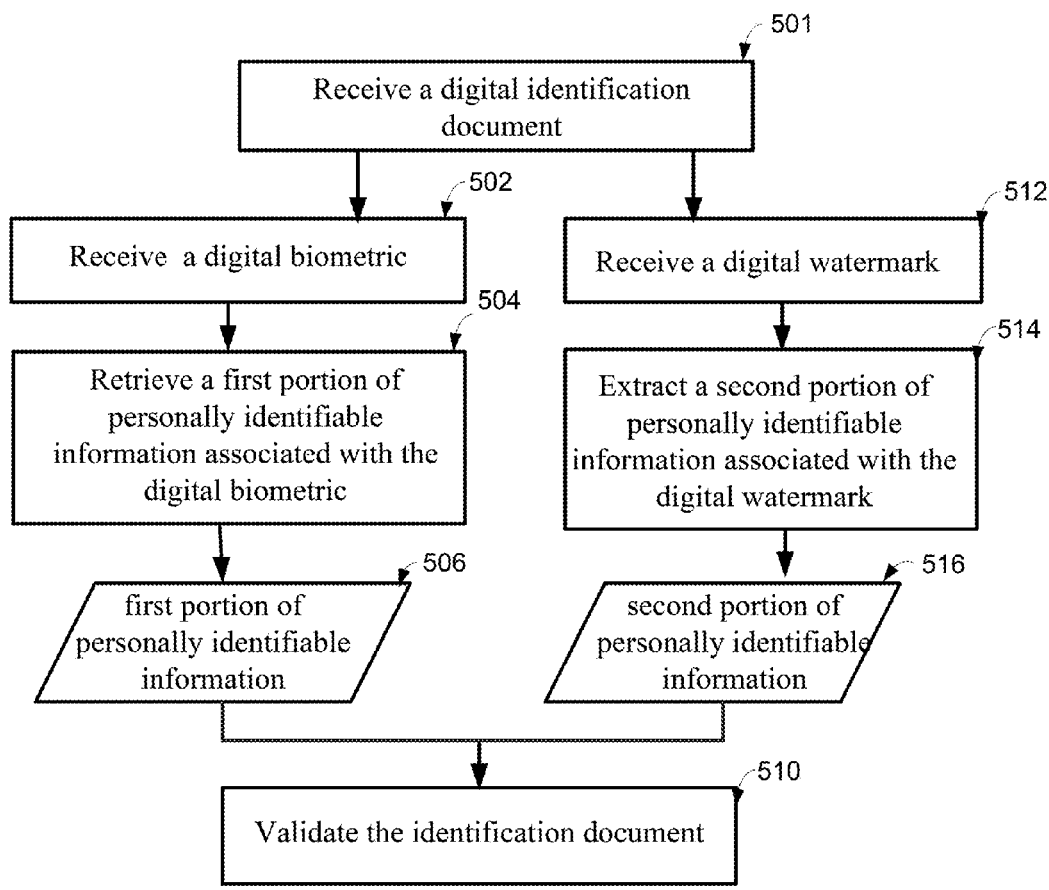
FIG. 5A is a flow chart showing an example method of validating the digital identification document according to some implementations.

FIG. 5A is a flow chart showing an example method of validating the digital identification document according to some implementations. The validation may be performed at a point of service. A point of service may refer to a point of sale, when the holder of the identification document attempts to buy or sell a merchandize. A point of server may generally refer to a point of transaction, when the holder of the identification document attempts to access an account, obtain entry into a facility, or any type of transaction for which a proof of identity may be required. At a point of service, when the holder of the digital identification document presents the digital identification document to prove his/her identity, the holder may present the touch screen of a mobile device to a human inspector. The human inspector may compare the displayed portrait against the presenter. If the displayed portrait does not match the presenter, the human inspector may reject any identity claim made by the presenter. In some implementations, if the human inspector determines that the displayed portrait matches the presenter, the human inspector may defer further processing to a reading device. In some implementations, the entire inspection may be performed by a reading device. The reading device may be any computing device with a processor and a transceiver as a data communications interface. To begin with, data encoding the digital identification document may be received by a reading device (501). The reading device may receive the digital identification document by scanning the touch screen of a mobile device. The reading device may receive the digital identification document via a communication link so that data encoding the digital identification document may be transmitted to the reading device, while a human inspector may inspect the digital identification document. The transmission of the data encoding the digital identification document may be wireless. In other words, the digital identification document may be beamed to the reading device.

Figure 5B:
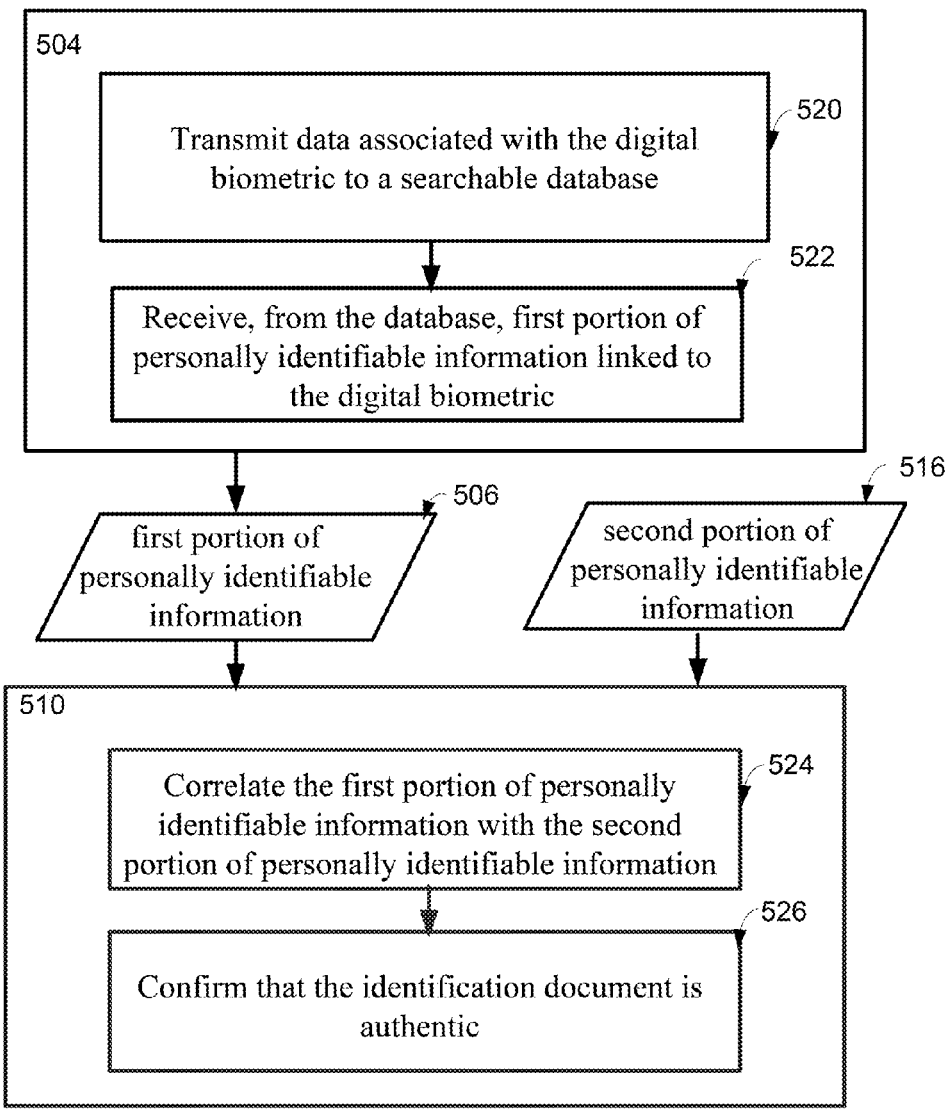
FIG. 5B is a flow chart showing an example process of validating the digital identification document according to some implementations.

Once the reading device receives the digital identification document, both the digital biometric (502) and the digital watermark (512) may be received at the reading device. The reading device may retrieve a first portion of personally identifiable information associated with the digital biometric (504). In some implementations, characteristics may be extracted from the digital biometric. As described above, these characteristics may include, for example, principal component values from a singular value decomposition, wavelet coefficients from a wavelet transform, etc. In some implementations, the extracted characteristics may be generated by facial recognition software on the reading device. In some implementations, the extracted characteristics may be compared against a searchable database at the point of service. In some implementations, the extracted characteristics may be transmitted to a central server. Referring to FIG. 5B, data encoding the extracted characteristics may be transmitted to a searchable database on the central server for comparison (520). If the search yields a match, then the corresponding personally identifiable information of the holder of the digital identification document may be retrieved. As discussed above, when issuing the digital identification document, a portion of the personally identifiable information associated with holder of the digital identification document may be stored on a searchable database of the issuing entity. The portion of the personally identifiable information stored at the server may be referred to as the first portion of the personally identifiable information. The server at the issuing entity may transmit the first portion of personally identifiable information back to the reading device. Thus, the first portion of personally identifiable information may be received at the point of service (522). As discussed above, the characteristics of the digital biometric may be a compact representation of the digital biometric and the overhead of storage or communication to the server may be reduced.

Returning to FIG. 5A, a portion of personally identifiable information 516 associated with the second digital watermark may be extracted (514). The extraction may be performed by the reading device on the digital identification document. Thereafter, the validity of the digital identification document may be confirmed based on the first portion of personally identifiable information 506 with the second portion of personally identifiable information 516 (510). Referring to FIG. 5B, the reading device may correlate the first portion of personally identifiable information 506 with the second portion of personally identifiable information 516 (524). In some implementations, the first and second portions of personally identifiable information may include a common piece of information, for example, the holder's birth date. Correlating the first and second portions may include comparing a piece of information meant to be identical in contents albeit encoded by two independent mechanisms. In addition, the two portions of personally identifiable information may be stored and retrieved separately. The introduced redundancy may further enhance confidence in validity determination. In some implementations, correlating may also include combining or concatenating pieces of information from the first and second portions. The correlation may yield a matching result confirming that the digital identification document is authentic (526). As discussed above, the match may not be perfect and may depend on the quality of the scanned image of the digital identification document, the context of the application, the sophistication of digital watermarking at a particular jurisdiction, or prior dealings of the holder of the digital identification document.

Figure 5C:
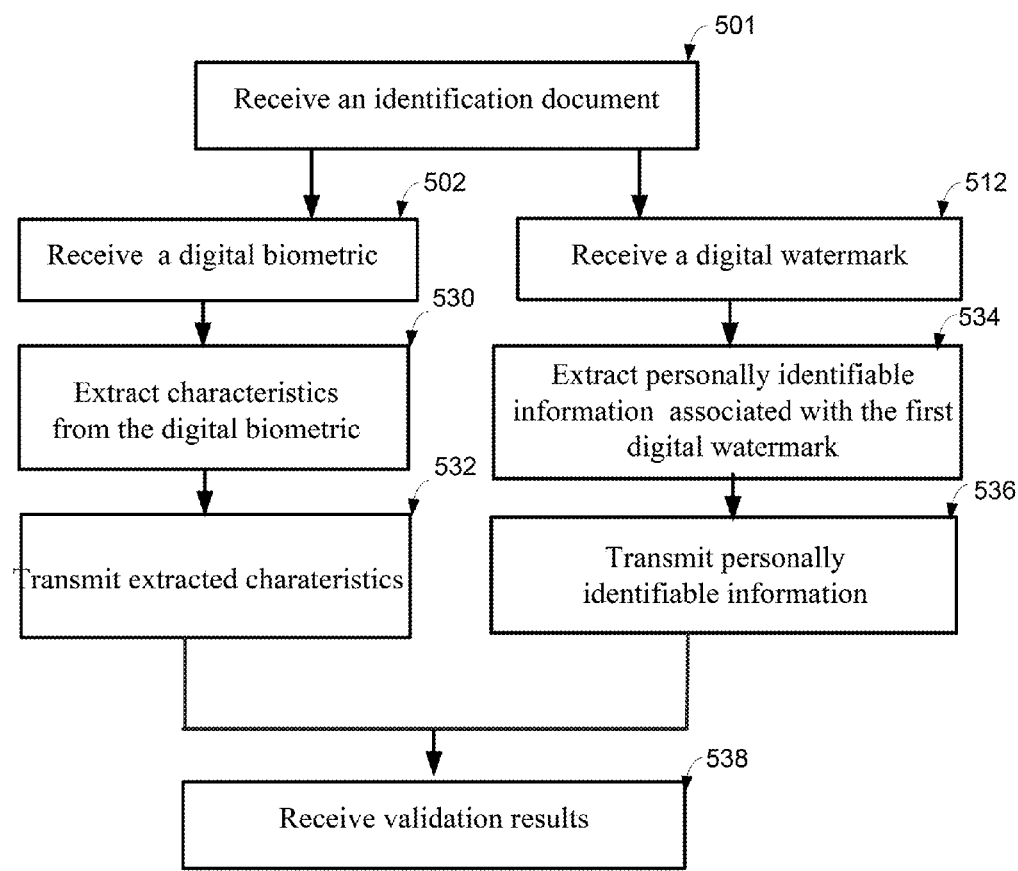
FIG. 5C is a flow chart showing an example method of validating the digital identification document according to some implementations.

FIG. 5C is a flow chart showing an example method of validating the digital identification document according to some implementations. In some implementations, once the digital biometric is received at the reading device, the characteristics of the digital biometric may be extracted (530) and then transmitted to a server at the issuing entity (532). Likewise, once the digital watermark has been received at the reading device, the encoded personally identifiable information may be extracted by the reading device (534). In accordance with the discussions above, the extracted personally identifiable information may be referred to as the second portion of personally identifiable information. The reading device may transmit the second portion of the personally identifiable information to the server (536). The server may be then validate the digital identification document. For example, the server may retrieve the first portion of personally identifiable information by searching the extracted characteristics against records in the searchable database. As discussed above, a matching record may reveal the first portion of the personally identifiable information. The server may then correlate the two portions of personally identifiable information to validate the digital identification document. The reading device may receive the validation results (538) and then notify the human inspector at the point of service. The notification may include a visual display of a textual message, an iconic message on a graphic display, a voice message, etc.

Figure 6A:
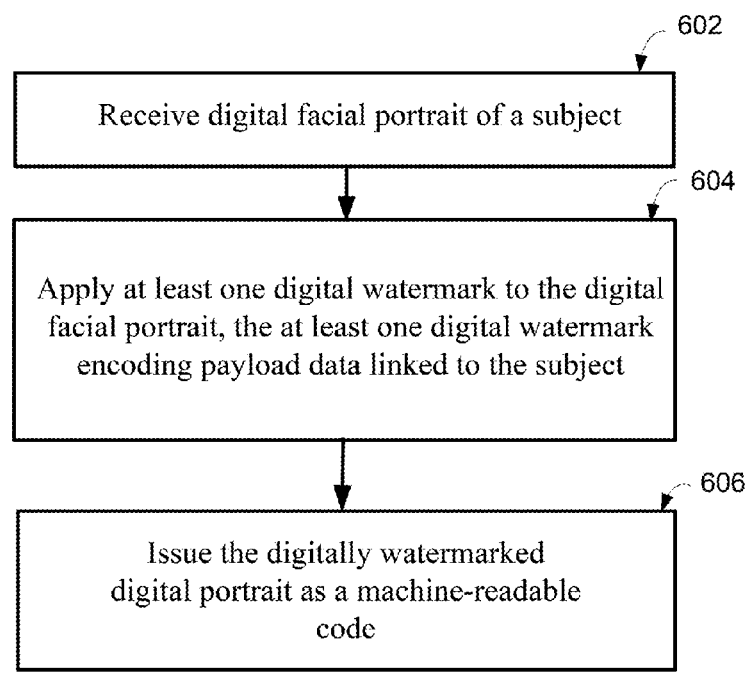
FIG. 6A is a flow chart showing an example method of digitally watermarking a digital portrait as a machine-readable code according to some implementations.

To prove identity at a point of service, a digitally watermarked portrait may be used as a personalized QR code in some implementations. FIG. 6A is a flow chart showing an example method of digitally watermarking a digital portrait as a machine-readable code according to some implementations. A digital facial portrait of a subject may be received at a server of an issuing entity (602). The digital facial portrait may be digitally stored on a storage device on the server. The facial portrait may be taken from the subject at any locations and may not be limited to studios or DMV offices. The digital facial portrait may have a virtual backdrop that replaces the actual backdrop. The digital portrait may comply with existing standards on biometrics, such as, for example, the International Civil Aviation Organization (ICAO) standard. The digital portrait may also comply with other standards under development.

Thereafter, at least one digital watermark may be applied to the digital facial portrait of the subject (604). The applied digital watermark may identify payload data associated with the subject. In some implementations, a digital watermark may be applied to carry payload data encoding a portion of personally identifiable information of the subject. For example, the digital watermark may include modulated Moire's pattern to carry the payload data. In some implementations, the digital watermark may be linked to personally identifiable information. For example, the digital watermark may include symbology marks identifying the subject being portrayed. In some implementations, digital watermarks including both luminance and chrominance modulations may be applied, as described above. In some implementations, the encoded information may be encrypted, as disclosed above. As discussed herein, the personally identifiable information may include name (including full name, first name, last name, middle/initials), date of birth, height, weight, residential address, gender, nationality, occupation, marital status, eye color, hair color, blood type election zone, document number, issue date, etc. In some implementations, the digital watermarks may encode information indicating the source or the issuing entity of the digital identification document.

Subsequently, the digitally watermarked digital portrait may be issued as a machine-readable code (606). In some implementations, the digitally watermarked digital portrait may be issued to a mobile device of the subject, for example, in the form of a digital file stored on the mobile device, as discussed above.

Figure 6B:
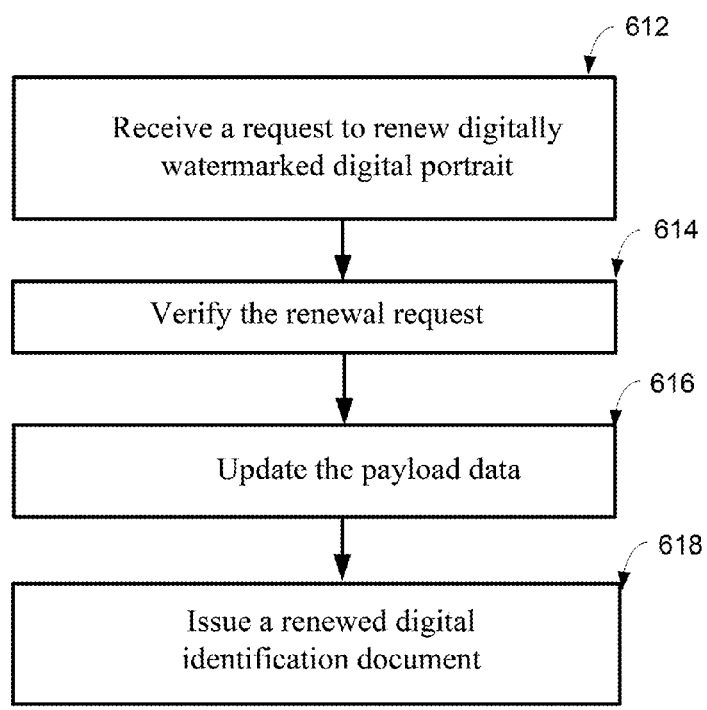
FIG. 6B is a flow chart showing an example process of renewing a digitally watermarked digital portrait according to some implementations.

The digitally watermarked digital portrait may lead to increased ease in document management. FIG. 6B is a flow chart showing an example process of renewing a digitally watermarked digital portrait according to some implementations. A request to renew the digitally watermarked digital portrait may be received (612). The renewal request may be received at the server of the issuing entity. The renewal request may be verified (614). For example, the server may check the source of the renewal request to confirm the validity of the request. The source may refer to the originating device, for example, the subject's mobile device. The source device may be verified based on a secured identifier associated with the mobile device. The source may also refer to the requestor who submitted the renewal request. The requestor may submit the request through an on-line account and therefore may be verified according to the user authentication protocol for accessing the on-line account. In submitting the renewal request, the subject may update some personally identifiable information, such as, for example, marital status, occupation, residential address, etc. The subject may also submit a more recent facial portrait. After receiving the updated personally identifiable information, the server may update payload data associated with the digital watermark accordingly (616). As discussed above, the payload data may encode a portion of the personally identifiable information of the subject. Thereafter, the server may issue a renewed digitally watermarked digital portrait (618). The renewed digitally watermarked digital portrait may be issued to the subject's mobile device for display in the same manner as described above. The renewed digitally watermarked digital portrait may be issued with a new expiration date later than the old expiration date of the replaced digitally watermarked digital portrait. In issuing the renewed digitally watermarked digital portrait, neither a physical trip to the issuing entity nor a physical copy may be required.

Figure 6C:
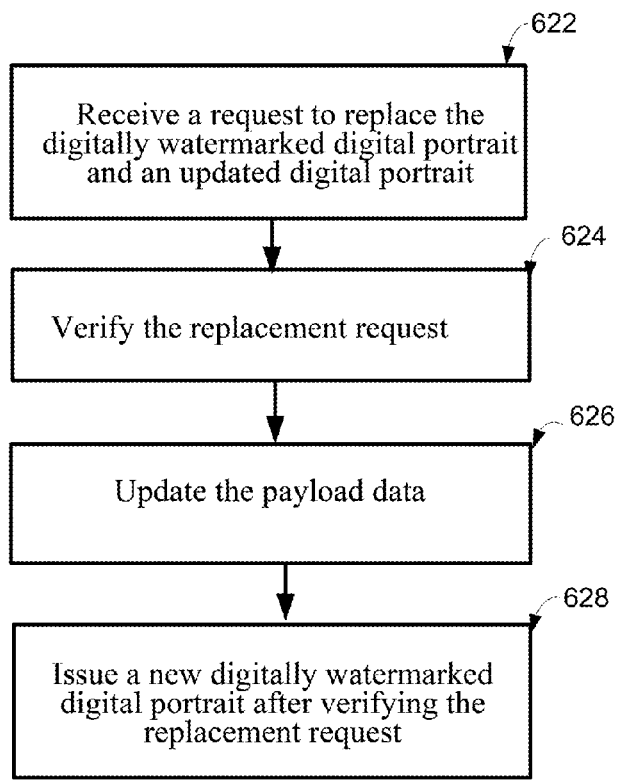
FIG. 6C is a flow chart showing an example process of replacing a digitally watermarked digital portrait according to some implementations.

Similar ease may be observed in the replacement process of the digitally watermarked digital portrait. FIG. 6C is a flow chart showing an example process of replacing a digitally watermarked digital portrait according to some implementations. A request to replace the digitally watermarked digital portrait may be received (622). The request may be received on-line by a server at the issuing entity. The server may verify the replacement request (624) by means similar to the descriptions above. The replacement request may update the personally identifiable information of the subject which may cause the server to update the payload data associated with the digital watermark to be applied (626). Thereafter, the replacement digitally watermarked digital portrait may be issued (628) in accordance with the descriptions herein. In some implementations, the digitally watermarked digital portrait may be issued with a version number to distinguish from the replaced digitally watermarked digital portrait. The version number may be tracked by the server in future administrations. Similar to the disposition of a renewal request, neither a physical trip to the issuing entity nor a physical copy may be required.

Figure 6D:
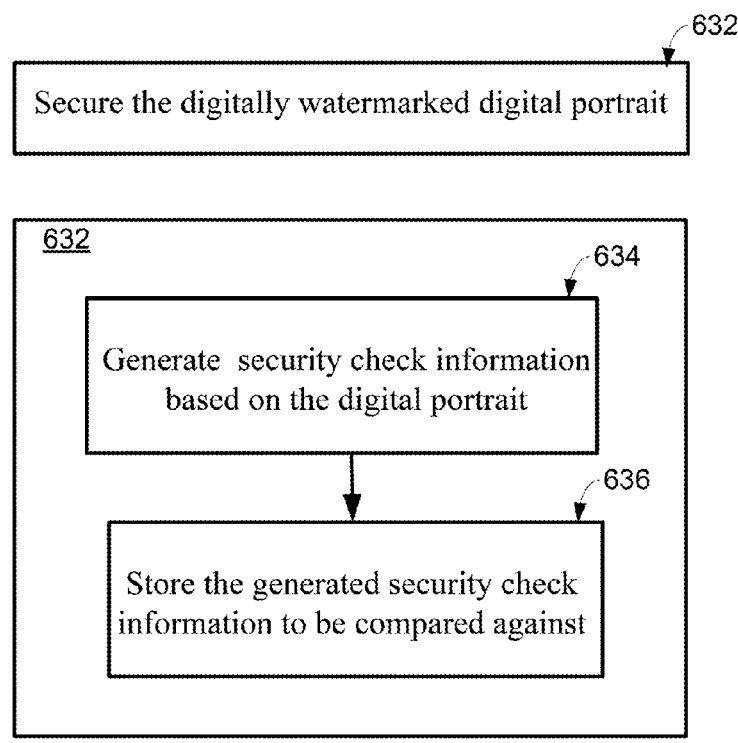
FIG. 6D is a flow chart showing an example method of securing a digitally watermarked digital portrait according to some implementations.

FIG. 6D is a flow chart showing an example method of securing a digitally watermarked digital portrait according to some implementations. In addition to encryption, the integrity of the digitally watermarked digital portrait may be secured (632), for example, based on security check information embedded into the digitally watermarked digital portrait. In particular, the integrity check information may be embedded into the digitally watermarked digital portrait based on which alterations of the digitally watermarked digital portrait can be detected. For example, security check information may be generated based on the contents of the digitally watermarked digital portrait (634). Such security check information may include but may not be limited to a check sum, a hash, a cyclic redundancy check (CRC) code, etc. The generated security check information may be stored for comparison. In some implementations, the security check information may be stored on a server at the issuing entity. In some implementations, the security check information may be stored on the mobile device. The stored copy may be compared against at the time of service.

Figure 6E:
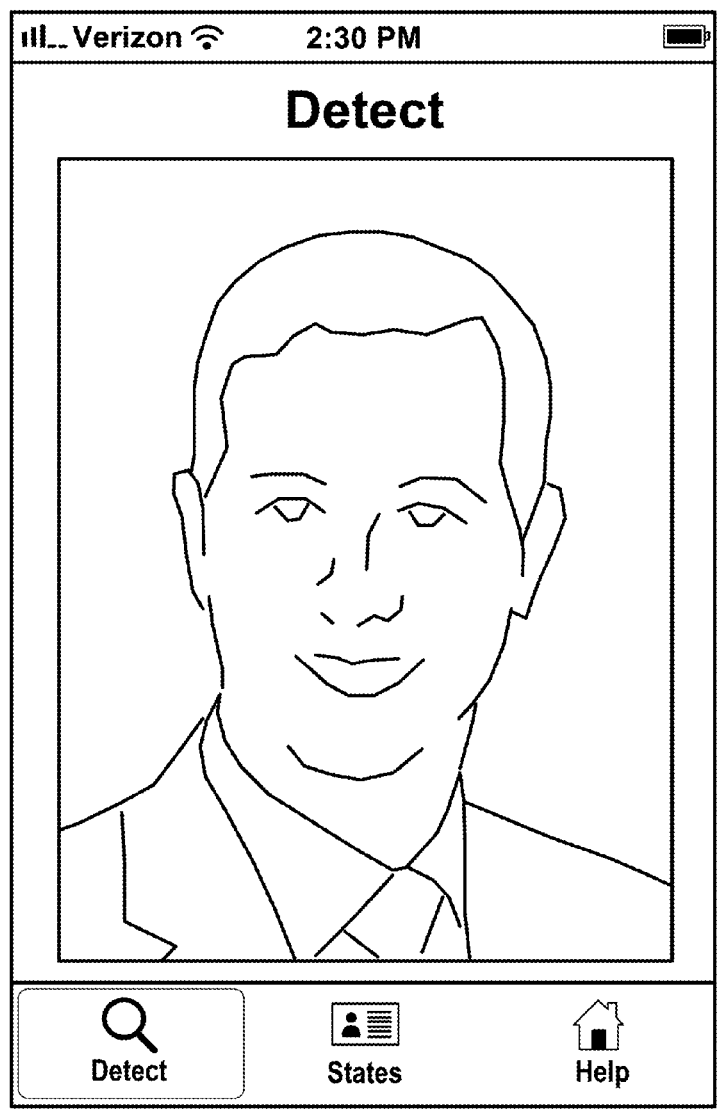
FIG. 6E shows an example digitally watermarked digital portrait displayed on a mobile device according to some implementations.

The digitally watermarked digital portrait may be displayed on, for example, a touch screen of the mobile device. FIG. 6E shows an example digitally watermarked digital portrait 640 displayed on the touch screen of a mobile device. The display may be managed by a custom application program on the mobile device with any of the security features described herein.

Figure 7A:
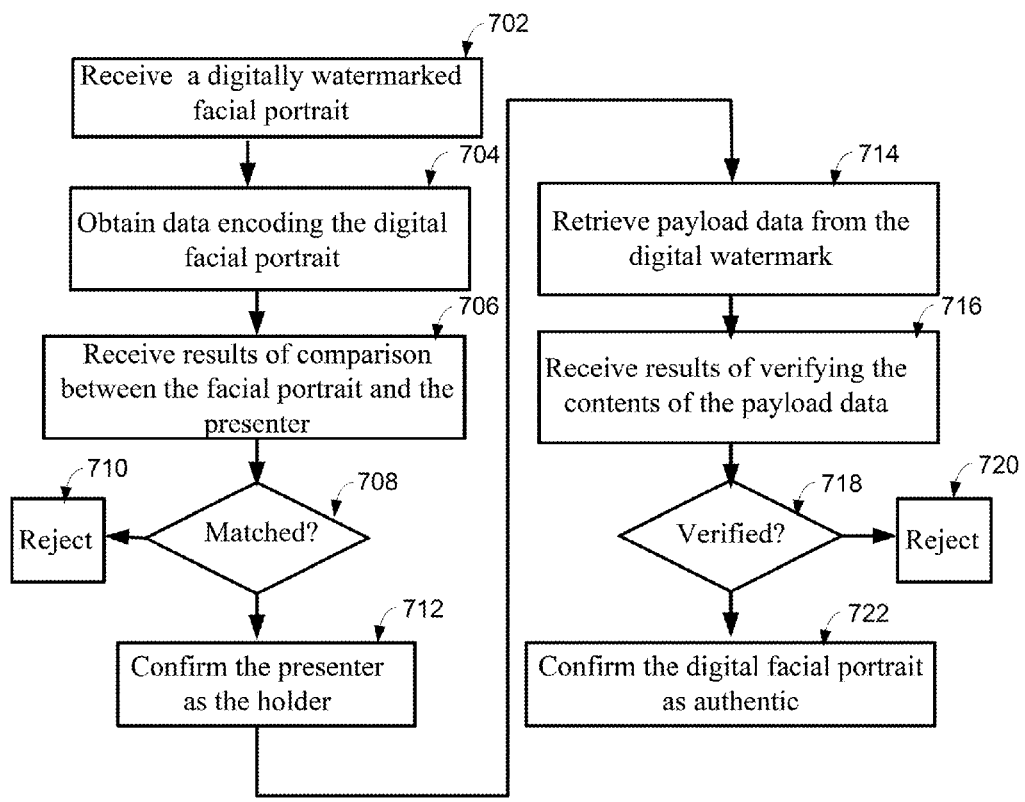
FIG. 7A is a flow chart showing an example method of validating the digitally watermarked digital portrait according to some implementations.

FIG. 7A is a flow chart showing an example method of validating the digitally watermarked digital portrait according to some implementations. As discussed above, the validation may be performed at a point of service. At a point of service, when the person presents the digitally watermarked digital portrait to prove his/her identity, the person may present the touch screen of a mobile device to a human inspector. The human inspector may compare the displayed portrait against the presenter. If the displayed portrait does not match the presenter, the human inspector may reject any identity claim made by the presenter. In some implementations, if the human inspector determines that the displayed portrait matches the presenter, the human inspector may defer further processing to a reading device.

In some implementations, the entire inspection may be performed by a reading device. The reading device may be any computing device with a processor and a transceiver as a data communications interface. The digitally watermarked digital portrait may be received at a reading device (702). For example, the reading device may receive the digitally watermarked digital portrait by scanning the touch screen of a mobile device. The reading device may receive the digitally watermarked digital portrait via a communication link so that data encoding the digitally watermarked digital portrait may be transmitted to the reading device. The transmission of the data encoding the digital identification document may be wireless. In other words, the digital identification document may be beamed to the reading device. Thus, the reading device may obtain data encoding the digitally watermarked digital portrait (704). In some implementations, the reading device may be configured to take a photo portrait of the presenter and then automatically compare the photo portrait with the digital portrait using facial recognition. The reading device may then receive results of comparison between the digital facial portrait and the presenter (706). The results may indicate whether the digital facial portrait matches the presenter (708). If the digital facial portrait does not match the presenter, the reading device may provide instructions to the human inspector to reject all identity claims by the presenter (710). If the digital facial portrait matches the presenter, the reading device may then confirm the presenter as the holder of the digitally watermarked digital portrait (712).

The reading device may then retrieve payload data from the digital watermark (714) in accordance with descriptions herein. The reading device may then receive results of verifying the contents of the payload data (716). As discussed above, the verification may include correlating two portions of personally identifiable information encoded by respective digital watermarks. The respective digital watermarks may incorporate separate modulation mechanism including luminance and chrominance. In some implementations, the verification may include correlating the personally identifiable information extracted from the digital watermark with records at a searchable database on a server.

Figure 7B:
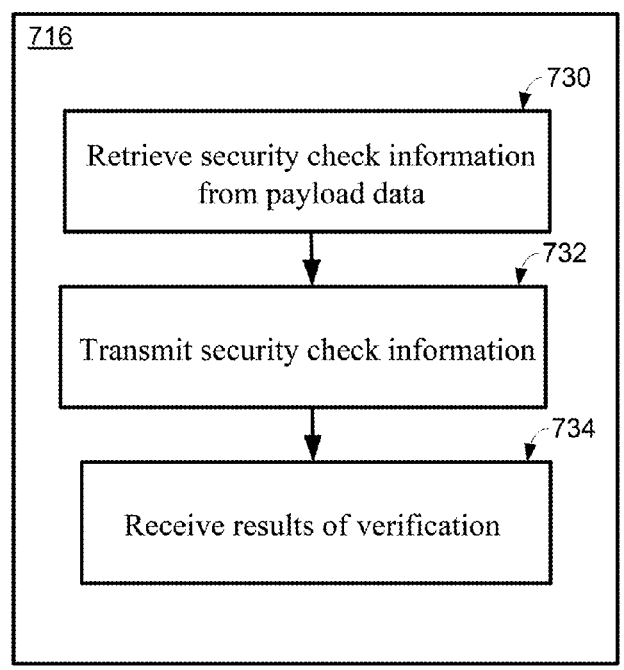
FIG. 7B is a flow chart showing an example process of authenticating the digital watermarked digital portrait.

Referring to FIG. 7B, in some implementations, the reading device may retrieve security check information from payload data of the digital watermark (730). As discussed above, the security check information may be generated at the time of issuance. For example, the security check information may capture a summary information of the digital portrait or personally identifiable information of the holder. The security check information may be a checksum, a hash, or any redundancy checking code. The retrieved security check information may be compared against the same summary information obtained from the digital portrait. In some implementations, the security check information may be transmitted to the server at the issuing entity for comparison (732). The server may compare the security check information with the summary information obtainable from the records at the server. As the discussed above, the correlation may not be a perfect correlation. Instead, the quality of the correlation may depend on the context of the application, sophistication of the issuing authority, and prior dealings of the holder. Thereafter, the reading device may receive results of the verification from the server (734).

Figure 8:
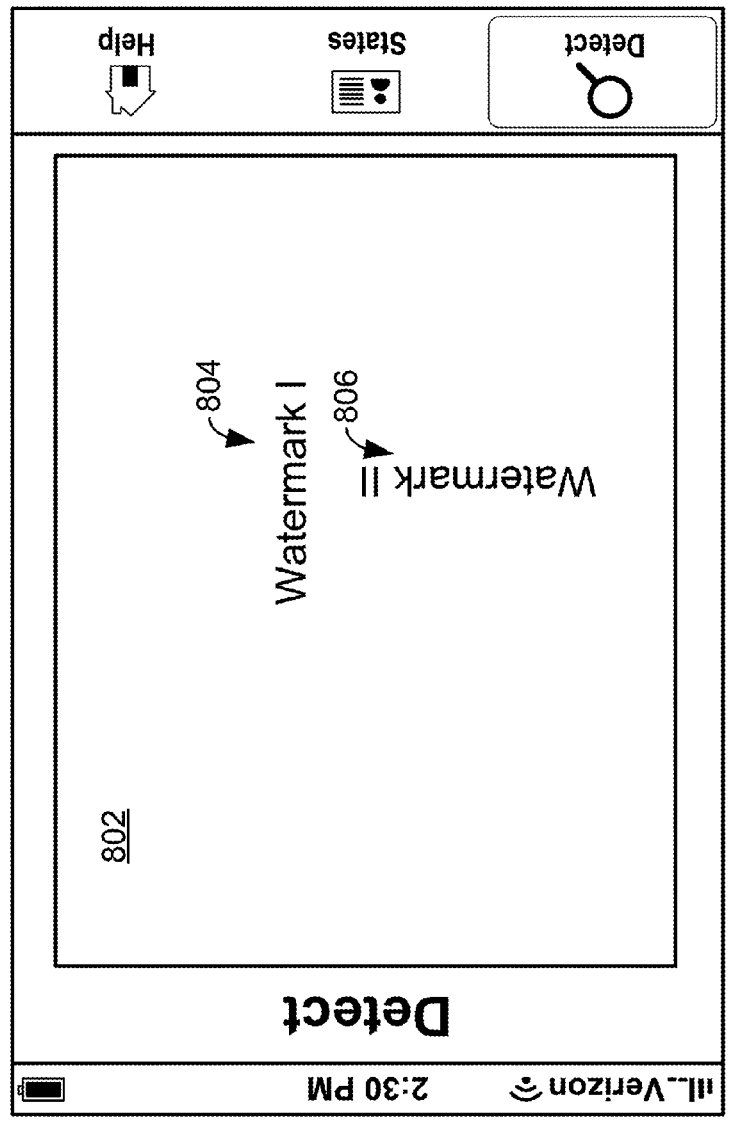
FIG. 8 shows a digital document with two embedded digital watermarks according to some implementations.

Returning to FIG. 7A, the results of correlation may indicate whether the contents of the payload data are verified. If the contents of the payload data are not verified, the reading device may prompt the human inspector to reject all identity claims by the presenter (720). If the contents of the payload data are verified, the reader device may indicate to the human inspector that the authenticity of the digitally watermarked digital portrait has been confirmed (722). In some implementations, multiple digital watermarks may be embedded in a digital document and a temporal pattern in which the multiple digital watermarks are detected can provide an additional level of security. FIG. 8 shows a digital document with two embedded digital watermarks according to some implementations. The digital document may include a digital identification document, for example, a digital driver's license, a digital passport, a digital identification card, etc. The digital document may also include any digital media with visual contents, such as, for example, a digital photo, a video clip, etc. In some implementations, the digital document may be issued by a government entity, such as, for example, the department of motor vehicles (DMV) of a state, the state department, the social security administration (SSA), the department of health and human services (DHHS), etc. In other implementations, the digital document may be issued by a non-government entity. Example non-government entities may include an employer, such as a corporation, a partnership, an academic institution, a non-profit organization, etc.

Digital document 802 may be presented on a mobile computing device of a user. For example, FIG. 8 illustrates configuration 800 in which digital document 802 is displayed on an touch-sensitive display screen of an iPhone. In other configurations, digital document 802 may be displayed for visualization on any other smart-phones, palm computing device, tablet computers, laptops, or even desktop computers, in a manner consistent with the descriptions herein. As discussed herein, a reader device may inspect the digital document 802. The reader device may scan the digital document 802 as displayed. The reader device may receive data encoding digital document 802, for example, from the user's mobile computing device. In certain configurations, the data encoding digital document 802 may be beamed to the reader.

Digital document 802 may include two digital watermarks 804 and 806. In one configuration, digital watermarks 804 and 806 may both include modulations of spatial luminance patterns. In another configuration, digital watermarks 804 and 806 may both include modulations of spatial chrominance distributions. In yet another configuration, digital watermarks 804 may include either a modulation of spatial luminance pattern or spatial chrominance distribution while digital watermark 806 may include the other. In still another configuration, digital watermarks 804 and 806 may be embedded at different locations on the digital document but may be linked to identical payload data. In yet still another configuration, digital document 802 may include more than two different digital watermarks. The additional digital watermark may be embedded on digital document 802 in a manner consistent with the descriptions herein.

Notably, the temporal dimension associated with the digital watermarks embedded in digital document 802 may serve as a basis to validate the authenticity of digital document 802. In some implementations, the digital watermarks may be inspected to validate that the digital document was indeed from a central entity that purportedly generated the digital document. In some implementations, the digital watermarks may be used for identification purposes. For example, in one configuration, the visual contents of the digital document may identify the person who holds the digital document. As discussed herein, such digital documents may include, but are not limited to, a digital driver license, a digital passport, a digital identification card, a digital facial portrait, etc. If the authenticity of the digital document can be validated based on the temporal pattern associated with the embedded digital watermarks, then the identity of the holder may be determined by comparing the visual contents of the digital document to the person presenting the digital document.

In certain implementations, the digital watermarks may carry payload data that identifies the person holding the digital document. In one configuration, the payload data may include personally identifiable information pointing to the holder of the digital document. The personally identifiable information may be extracted and then compared to verify the identity of the presenter. The extracted personally identifiable information may also be transmitted to a central server for confirmation. In another configuration, the payload data may also include biometric data that identifies the holder of the digital document. Such biometric data may be extracted and compared with the biometric data of the person presenting the digital document. The extracted biometric data may be transmitted to a central server where the comparison may be conducted. The presenter's identity may be established by an affirmative result of the comparison.

Figure 9A:
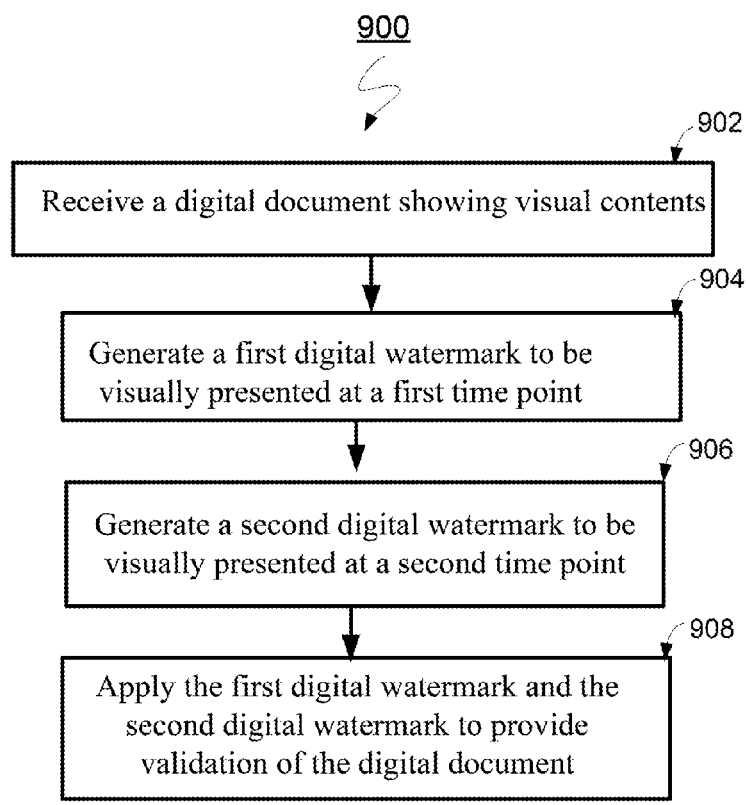
FIG. 9A is a flow chart showing an example method of securing a digital document with at least two digital watermarks according to some implementations.

FIG. 9A is a flow chart 900 showing an example method of securing a digital document with at least two digital watermarks according to some implementations. The digital document may be issued from a central entity, as discussed herein. A server at the central entity may receive a digital document that includes visual contents (902). In response, the server may generate a first digital watermark. The first digital watermark may be visually presented on the digital document at a first time point (904). The server may also generate a second digital watermark. The second digital watermark may be different from the first digital watermark. For example, the second digital watermark may include a different Moire's pattern, a different symbology, or a different embedding location on the digital document. The second digital watermark may be visually presented on the digital document at a second time point, different from the first time point (906).

Once the two digital watermarks are generated, the server may apply the two digital watermarks to the digital document to provide validation of the digital document (908). In some implementations, the digital watermarks may be embedded in the background of the digital document, e.g., a digital identification document. The digital watermarks may be imperceptible to naked eyes inspecting the digital document without instrumentations. The digital watermarks also may be visible to naked eyes without further assistance from instrumentations. In some implementations, the digital watermark may appear as additive noise of the discrete cosine transform coefficients (DCT) that encodes the digital identification document. Alternatively or in addition, the digital watermarks may be embedded in data associated with the digital document. The digital watermarks may be embedded in the meta data that describes the digital document. The digital watermarks also may be embedded in a control frame, e.g., the synchronization frame, of a digital video clip. As discussed herein, the embedded digital watermarks may be extracted, and the digital document may be validated based on the extracted digital watermarks.

Figure 9B:
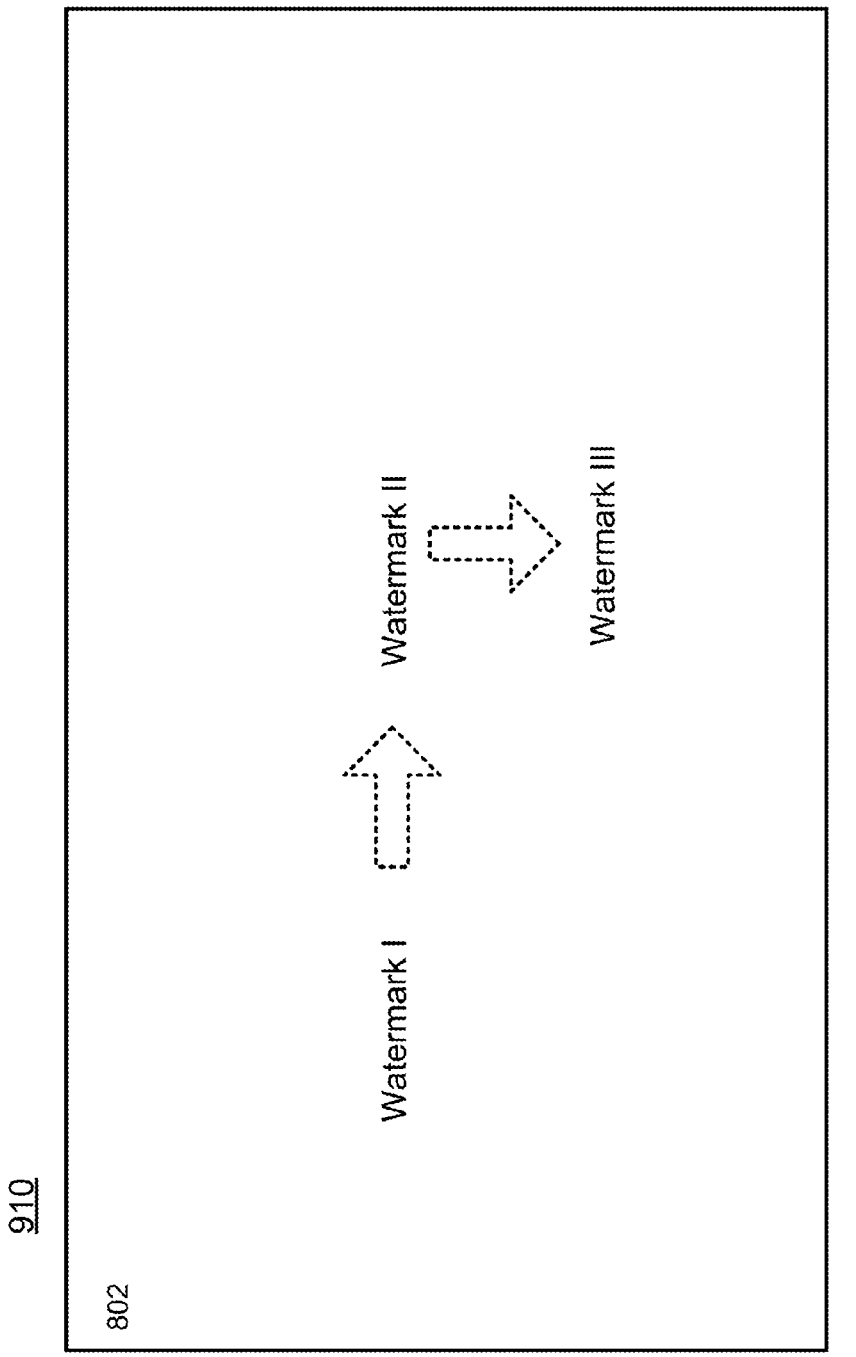
FIG. 9B illustrates using a sequence of at least two digital watermarks to validate a digital document according to some implementations.

FIG. 9B illustrates using a sequence of at least two digital watermarks to validate a digital document according to some implementations. On detection, digital watermarks may be presented in a temporal sequence. As illustrated in FIG. 9B, digital watermark I may be presented first, followed by digital watermark II to the right. Subsequently, digital watermark III may be displayed below. The order in which the digital watermarks appear in the sequence may validate that the digital document is authentic. In order words, the at least two digital watermarks may provide a "video signature" attesting to the authenticity or validity of the digital document.

In some implementations, the digital watermarks may be flashed and the flash trajectory on the digital document 802 may be linked to either the entity that generated the digital document or the person holding the digital document. In one configuration, the flash trajectory may represent the acronym of the organization or the initials of the person holding the digital document. In another configuration, the digital watermarks may encode one symbol and the flashing manner may convey a motion of the same symbol, for example, a rotating motion, a spiraling motion, a dilating motion, a contracting motion, etc. Hence, the sequence of the flashed digital watermarks may become a "video signature" linking the entity that has generated the digital document or the person holding the digital document.

In one configuration, the flash rate may be slow and the gap between the respective presentation time points of each digital watermark may be longer than the dwell time of sensory cells on the human retina. The retina dwell time correspond to the time period that a visual stimulus may reside on the sensory cells in the fovea area in the retina. When the gap time is larger than the dwell time, the later flashes may be distinguished from the earlier flashes and the flash trajectory may be visualized by naked eyes without further instrumentation.

In another configuration the flash rate may be fast and the gap time may be shorter than the dwell time. In such a configuration, the digital watermarks may appear, to the naked eye, as being on continuous display. However, an instrument, such as a video camera with an adequate frame rate, may reveal the temporal sequence in which the digital watermarks are presented. The temporal patterns according to which the digital watermarks are displayed may encode additional information capable of authenticating or validating digital document 802.

FIG. 9C is a timing diagram 920 showing example temporal patterns according to which two digital watermarks may be displayed. The top panel illustrates the time course in which the first digital watermark is presented. A high level indicates the temporal locations when the digital watermark is on display. A low level indicates when the digital watermark is not on display. The bottom panel shows the time course in which the second digital watermark is presented, based on the same illustration conventions as discussed above. Furthermore, the digital watermarks may be presented intermittently and the above time courses may be repeated.

The timing diagrams as shown above may encode information in addition to the payload data of the digital watermarks. In some implementations, such additional information may be encoded by digital phase-shift keying (DPSK) techniques. In one configuration, the phase may be determined by the display duration of a particular digital watermark. In another configuration, the rising or falling edges of the presentation window may determine the encoded phase. In some implementations, the encoding scheme may employ a binary phase-shifting keying (BPSK) in which only two states are encoded (on display and not on display). In other implementations, the encoding scheme may use a quadrature phase-shifting keying (QPSK) in which four states may be encoded. The additional keying states may be derived from added states of the presentation timing diagram of one digital watermark. The additional states also may include the combination of states from the presentation timing diagram of other digital watermarks. Hence, the information may be encoded in the temporal presentation sequence of the digital watermarks using any existing or yet to be developed digital communication coding techniques.

Although the timing diagrams correspond to a presentation scheme in which a particular digital watermark is either shown or not shown, some implementations may present the particular digital watermark with varying display intensities at various presentation times. Thus, in these implementations with intensity variations, amplitude modulation may be employed to encode information in addition to the payload data of the particular digital watermark.

When two digital watermarks are embedded on one digital document, the payload data associated with one particular digital watermark may include integrity check information for the other digital watermark. Moreover, the payload data associated with the other digital watermark may include integrity check information for the particular digital watermark. The integrity check information may include, for example, a hash, a check-sum, a cyclic redundancy code (CRC), etc. As discussed herein, the cross-check feature may provide the same additional security mechanism against tampering with or alteration of the digital document (including the embedded digital watermarks).

The digital watermarks may be applied to a digital document, which may then be issued to a user on his/her mobile device, for example, an iPhone. At a point of service, the digital document may be displayed on the touch-screen display of the mobile device.

Figure 10A:
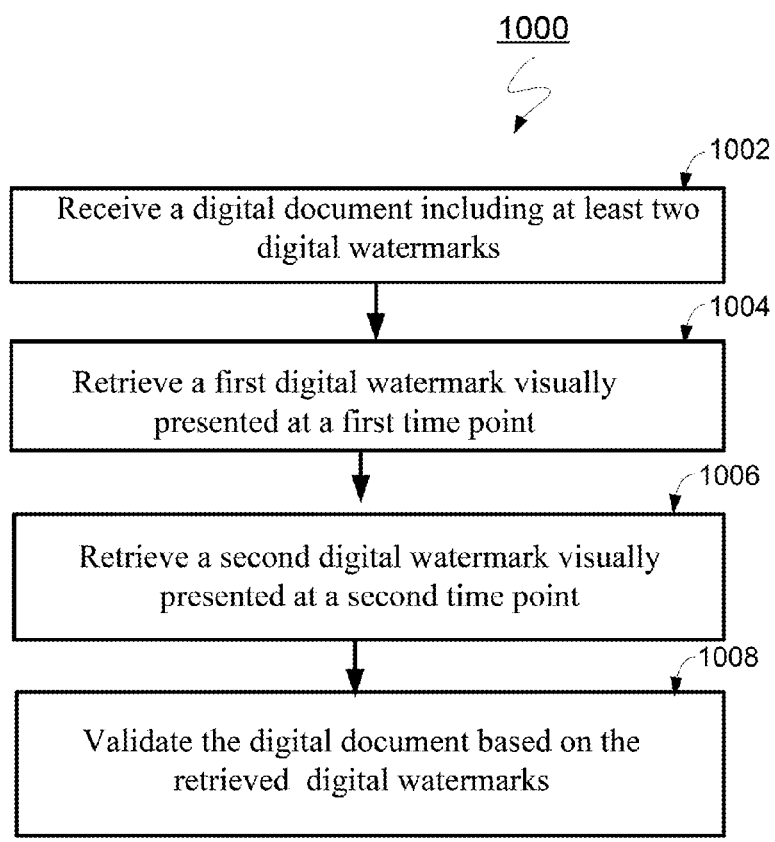
FIG. 10A is a flow chart showing an example method of validating a digital document based on at least two digital watermarks according to some implementations.

FIG. 10A is a flow chart showing an example method of validating a digital document based on at least two digital watermarks according to some implementations. The flow may initiate by receiving the digital document including the at least two digital watermarks (1002). Thereafter, the first digital watermark may be retrieved when the first digital watermark is presented at first time point (1004). Subsequently, the second digital watermark may be retrieved when the second digital watermark is presented at a second time point (1006). Thus, a temporal sequence of digital watermarks may be retrieved and used to validate the digital document (1008). In some implementations, the temporal sequence may include more than two digital watermarks. The temporal sequence may validate that the digital document is indeed from the entity that purportedly generated the digital document. As discussed herein, the sequence of digital watermarks presented may become a "video signature" linking either the entity who has generated the digital document or the person holding the digital document.

Figure 10B:
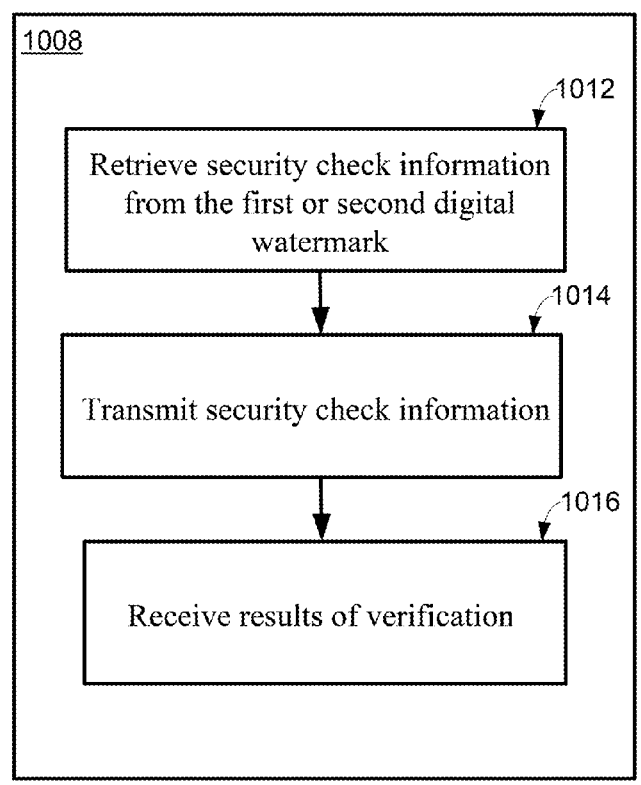
FIG. 10B is a flow chart showing an example method of validating a digital document according to some implementations.

FIG. 10B is a flow chart showing an example method of validating a digital document according to some implementations. Security check information may be retrieved from the first or second digital watermark (1012). In some implementations, the security check information may be extracted from the payload data of the first or second digital watermark. In other implementations, the security check information may also be decoded from the temporal pattern in which the first or the second digital watermark is presented. As discussed herein, the temporal pattern in which the digital watermarks are presented may encode information in addition to the payload data of the particular digital watermark. The additional information encoded by the temporal pattern may be retrieved by demodulators, for example, on a reader device, configured to decode the encoded additional information.

In some implementations, the decoded security check information may be transmitted to a remote central server for verification (1014). The verification results may be received from the remote central server (1016). In other implementations, the verification may be performed locally and without transmitting the security check information to the remote central server. The validity of the digital document, or the identity of the holder, may be determined based on the verification results.

Figure 11:
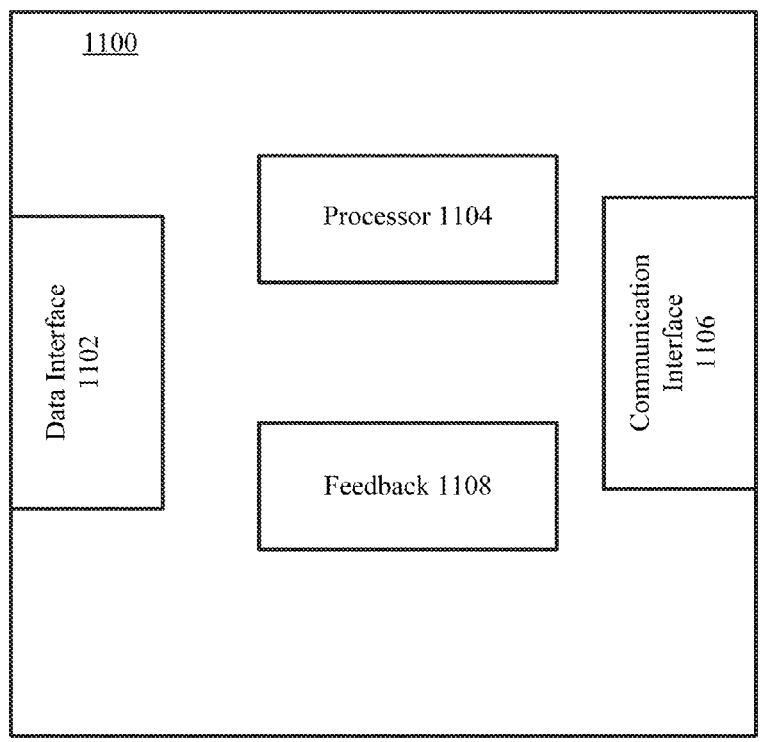
FIG. 11 is a diagram showing an example reading device for validating an identification document according to some implementations.

FIG. 11 is a diagram showing an example reading device 1100 for validating an identification document according to some implementations. Reading device may be configured to read any of the identification document or digital portrait watermarked in accordance with the description herein. Reading device 1100 may include data interface 1102 to read in data. For example, data interface 1102 may include a scanning device to scan an identification document presented, a digital identification document displayed on the touch screen of a mobile device, a digital portrait displayed on the touch screen of a mobile device. In some implementations, data interface 1102 may read data from a physical identification document, for example, a magnetic stripe, a chip, etc. on the identification document. In some implementations, data interface 1102 may establish a wireless link with a mobile device of the presenter of a digital identification document or digital portrait. Data interface 1102 may then receive data encoding the digital identification document or the digital portrait through the wireless link. The wireless link may utilize any region on the electromagnetic spectrum, including the infrared band.

Reading device may include processor 1104 configured to validate the identification document or the digital portrait in accordance with the descriptions above. For example, processor 1104 may be configured to implement facial recognition algorithms to extract characteristics from the portrait on the identification document. Processor 1104 may be configured to implement feature recognition algorithms to extract characteristics from other biometrics such as finger-prints, iris patterns etc. In some implementations, processor 1104 may be configured to retrieve personally identifiable information from the payload data associated with the digital watermarks. As discussed above, processor 1104 may be configured to validate an identification document based on portions of personally identifiable information identified by respective digital watermarks using separate mechanisms.

Reading device 1100 may include communication interface 1106 configured to transmit data to a server at the issuing entity. The data may include the extracted characteristics or the retrieved personally identification document. As discussed above, the server may compare the extracted characteristics to records at a searchable database. The server may compare the retrieved personally identifiable information against records at the searchable database. Communication interface 1106 may also be configured to receive verification results from the server. Communication interface 1106 may be built on wired or wireless technologies to transmit data to and receive data from the server.

Reading device 1100 may additionally include feedback device 1108. Feedback device 1108 may be configured to provide instructions to a human inspector. For example, feedback device 1108 may include a graphical interface to display textual messages or iconic indications to the human inspector. In some implementations, feedback device 1108 may additionally include sound devices to alert the human inspector of the verification results, for example, through a text to speech technology.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful.

Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for applying at least two digital watermarks to a digital document, the method comprising:
   receiving a digital document comprising visual contents;
   generating a first digital watermark to be visually presented at a first time point;
   generating a second digital watermark to be visually presented at a second time point, the second digital watermark being different from the first digital watermark and the second time point being different from the first time point; and
   applying the first digital watermark and the second digital watermark to the digital document such that the first time point differs from the second time point by an amount shorter than a retina dwell time.

2. The method of claim 1, further comprising:
   applying both the first digital watermark and the second digital watermark to form a sequence of digital watermarks capable of providing validation of the digital document.

3. The method of claim 2, further comprising:
   applying the first digital watermark and second digital watermark to the digital document to provide authentication of a person holding the digital document.

4. The method of claim 2, further comprising:
   linking the sequence of digital watermarks to an entity issuing the digital document.

5. The method of claim 2, further comprising:
   linking the sequence of digital watermarks to a person holding the digital document.

6. The method of claim 1, further comprising:
   generating one or more additional digital watermark to be visually presented at a respective time points, the one or more digital watermark being different from the first and second digital watermark, and the respective time points being different from the first and second digital watermark.

7. The method of claim 1, further comprising:
   applying the first digital watermark such that the first digital watermark is visually presented intermittently according to a first temporal pattern.

8. The method of claim 7, further comprising:
   configuring the first temporal pattern to encode information linking an entity issuing the digital document with at least two digital watermarks.

9. The method of claim 8, further comprising:
configuring the first temporal pattern to encode information linking a person holding the generated digital document with at least two digital watermarks.

10. The method of claim 1, further comprising:
applying the second digital watermark such that the second digital watermark is visually presented intermittently according to a second temporal pattern.

11. The method of claim 10, further comprising:
configuring the second temporal pattern to encode information linking an entity issuing the digital document with at least two digital watermarks.

12. The method of claim 10, further comprising:
configuring the second temporal pattern to encode information linking a person holding the generated digital document with at least two digital watermarks.

13. The method of claim 1, wherein generating the first digital watermark further comprises:
generating the first digital watermark to encode information correlatable with data encoded by the second digital watermark.

14. The method of claim 1, wherein generating the second digital watermark further comprises:
generating the second digital watermark to encode information correlatable with data encoded by the first digital watermark.

15. A system for digitizing an identification document, the system comprising at least one computer processor configured to perform the operations of:
receiving a digital document comprising visual contents;
generating a first digital watermark to be visually presented at a first time point;
generating a second digital watermark to be visually presented at a second time point, the second digital watermark being different from the first digital watermark and the second time point being different from the first time point; and
applying the first digital watermark and the second digital watermark to the digital document such that the first time point differs from the second time point by an amount shorter than a retina dwell time.

16. The system of claim 15, wherein the operations further comprise:
applying both the first digital watermark and the second digital watermark to form a sequence of digital watermarks capable of providing validation of the digital document.

17. The system of claim 16, wherein the operations further comprise:
applying the first digital watermark and second digital watermark to the digital document to provide authentication of a person holding the digital document.

18. The system of claim 16, wherein the operations further comprise:
linking the sequence of digital watermarks to an entity issuing the digital document.

19. The system of claim 16, wherein the operations further comprise:
linking the sequence of digital watermarks to a person holding the digital document.

20. The system of claim 15, wherein the operations further comprise:
generating one or more digital watermark to be visually presented at respective time points, the one or more digital watermark being different from the first and second digital watermark, and the respective time points being different from the first and second digital watermark.

21. The system of claim 15, wherein the operations further comprise:
applying the first digital watermark such that the first digital watermark is visually presented intermittently according to a first temporal pattern.

22. The system of claim 21, wherein the operations further comprise:
configuring the first temporal pattern to encode information linking an entity issuing the digital document with at least two digital watermarks.

23. The system of claim 21, wherein the operations further comprise:
configuring the first temporal pattern to encode information linking a person holding the generated digital document with at least two digital watermarks.

24. The system of claim 15, wherein the operations further comprise:
applying the second digital watermark such that the second digital watermark is visually presented intermittently according to a second temporal pattern.

25. The system of claim 24, wherein the operations further comprise:
configuring the second temporal pattern to encode information linking an entity issuing the digital document with at least two digital watermarks.

26. The system of claim 24, wherein the operations further comprise:
configuring the second temporal pattern to encode information linking a person holding the generated digital document with at least two digital watermarks.

27. The system of claim 15, wherein generating the first digital watermark further comprises:
generating the first digital watermark to encode information correlatable with data encoded by the second digital watermark.

28. The system of claim 15, wherein generating the second digital watermark further comprises:
generating the second digital watermark to encode information correlatable with data encoded by the first digital watermark.

29. A non-transitory computer-readable medium, comprising software instructions stored thereon that, when executed by a processor, causes the processor to perform the operations of:
receiving a digital document comprising visual contents;
generating a first digital watermark to be visually presented at a first time point;
generating a second digital watermark to be visually presented at a second time point, the second digital watermark being different from the first digital watermark and the second time point being different from the first time point; and
applying the first digital watermark and the second digital watermark to the digital document such that the first time point differs from the second time point by an amount shorter than a retina dwell time.

* * * * *